US006772133B1

(12) United States Patent
Kambayashi et al.

(10) Patent No.: US 6,772,133 B1
(45) Date of Patent: Aug. 3, 2004

(54) INFORMATION RECORDING DEVICE AND INFORMATION REPRODUCTING DEVICE

(75) Inventors: Toru Kambayashi, Chigasaki (JP); Koichiro Akiyama, Tokyo (JP); Yutaka Handa, Yokohama (JP); Yoshihiro Ohmori, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/518,130

(22) Filed: Mar. 3, 2000

(30) Foreign Application Priority Data

Mar. 5, 1999 (JP) ............................................ 11-058890

(51) Int. Cl.[7] .............................................. G06F 17/60
(52) U.S. Cl. .......................... 705/57; 705/59; 705/51; 705/58; 713/160; 380/201; 380/203
(58) Field of Search ...................... 705/50–59; 380/201, 380/203; 713/160

(56) References Cited

U.S. PATENT DOCUMENTS

| 5,935,243 | A | | 8/1999 | Hasebe et al. | |
|---|---|---|---|---|---|
| 6,226,618 | B1 | * | 5/2001 | Downs et al. | ................... 705/1 |
| 6,389,402 | B1 | * | 5/2002 | Ginter et al. | ................... 705/51 |
| 2001/0052001 | A1 | * | 12/2001 | Stern | ........................ 709/219 |

FOREIGN PATENT DOCUMENTS

| EP | 0 691 762 | | 1/1996 | | |
|---|---|---|---|---|---|
| EP | 0 769 780 | | 4/1997 | | |
| EP | 0 807 931 | | 11/1997 | | |
| EP | 0809221 A2 | * | 11/1997 | ............ | G07F/17/16 |
| EP | 0 809 244 | | 11/1997 | | |
| EP | 0 813 194 | | 12/1997 | | |
| EP | 0 889 470 | | 1/1999 | | |
| EP | 1 006 526 | | 6/2000 | | |
| JP | 2000-099010 | * | 7/2000 | ............. | G10H/1/00 |

OTHER PUBLICATIONS

Dialog file 148, Accession No. 08822460 to Yamada, Ken discloses a managemetn system for checking software rights.*

* cited by examiner

*Primary Examiner*—James P. Trammell
*Assistant Examiner*—Jalatee Worjloh
(74) *Attorney, Agent, or Firm*—Oblon, Spivak, McClelland, Maier & Neustadt, P.C.

(57) ABSTRACT

The information reproduction device for reproducing contents information based on license information added to the contents information and required for reproducing the contents information, includes a determining section for determining whether encrypted contents information is the officially copied contents information or privately copied contents information based on the contents of the license information, and a reproduction section configured to reproduce the contents information determined as the privately copied contents information by the determining section under more severe restriction than the officially copied contents information. Thus, the contents copied by the proper route (officially copied contents) can be distributed in a more advantageous form than the contents copied without proper authorization.

5 Claims, 33 Drawing Sheets

DIGITAL LICENSE INFORMATION Lo

| LICENSE HEADER (LH) | CONTENTS KEY (Kc) | CONTENTS UTILIZATION CONDITION (U) | CERTIFICATOR (MAC) | DIGITAL SIGNATURE |
|---|---|---|---|---|

FIG. 1

ENCRYPTED DIGITAL LICENSE INFORMATION L

| LICENSE HEADER (LH) | CONTENTS KEY (Kc) | CONTENTS UTILIZATION CONDITION (U) | CERTIFICATOR (MAC) | DIGITAL SIGNATURE |
|---|---|---|---|---|

LICENSE HEADER LH

| LENGTH OF LICENSE INFORMATION | CONTENTS ID | COPY INFORMATION | LENGTH OF CONTENTS KEY |
|---|---|---|---|

FIG. 3

CONTENTS UTILIZATION CONDITION (U)

| DIGITAL OUTPUT FLAG (Fe) | EFFECTIVE DATE INFORMATION | EFFECTIVE NUMBER OF TIMES INFORMATION |
|---|---|---|

FIG. 4

ANALOG LICENSE INFORMATION La

| NUMBER OF COPY TIMES RESTRICTION INFORMATION | COPY INFORMATION |
|---|---|

FIG. 5

DIGITAL SIGNATURE

| DIGITAL SIGNATURE HEADER | DIGITAL SIGNATURE |
|---|---|

FIG. 6

DIGITAL SIGNATURE HEADER

| OVERALL LENGTH OF DIGITAL SIGNATURE | KIND OF SIGNATURE | SIGNATURE OF VERIFICATION KEY NO. |
|---|---|---|

FIG. 7

FROM S253(FIG.27)
↓
CREATE ENCRYPTED DIGITAL LICENSE INFORMATION L OF ORIGINAL CONTENTS  ~S264
↓
TO S262(FIG.28)

FIG. 29

COPY FORM INFORMATION Q

| CATEGORY OF COPY CONTENTS | COPY UTILIZATION CONDITION INFORMATION |
|---|---|

FIG. 30

UTILIZATION CONDITION INFORMATION

| DIGITAL OUTPUT FLAG (Fe) | EFFECTIVE DATE INFORMATION | EFFECTIVE NUMBER OF UTILIZATION TIMES INFORMATION | NUMBER OF COPY TIMES RESTRICTION INFORMATION |
|---|---|---|---|

FIG. 31

| CLIENT ID | CONTENTS ID (CID) | PURCHASE UTILIZATION CONDITION Uc | MEDIA ID (MID) | CLIENT ADDRESS |
|---|---|---|---|---|

FIG. 39

INFORMATION RECORDING DEVICE AND INFORMATION REPRODUCTING DEVICE

CROSS-REFERENCE TO RELATED APPLICATION

This application is based upon and claims the benefit of priority from the prior Japanese Patent Application No. 11-058890, filed Mar. 5, 1999, the entire contents of which are incorporated herein by reference.

BACKGROUND OF THE INVENTION

The present invention relates to devices for recording and reproducing the contents, including images, voice data and the like.

The digital contents reproduction devices including a CD player are popularly accepted because of clear tone quality and less degradation of tone quality caused by long-term use. However, it has become possible to copy digital contents free of degradation by faithfully duplicating it bit by bit, and in actuality such devices have already been commercialized. The presence of such copying device is a great advantage to the contents user, but for the contents provider, it is not desirable because such device exerts tremendous influence on the sales of contents.

Consequently, the contents provider copes with new digital devices (and media) when they are commercialized by not providing them with the contents. However, this condition causes big interference to popularization of new electronic devices, and prevents not only almost all people from enjoying the convenience but also contents providers from enjoying business chances.

On the other hand, the privately copied contents for the user to enjoy the contents personally is the right authorized by the Copyright Law, and in actuality, for many electronic devices, the privately copied contents has been admitted with some restriction to the duplication system (restriction to the analog recording, etc.). However, when digital recording becomes the mainstream in years to come, it becomes difficult to determine the privately copied contents from officially copied contents, and at the same time, it becomes difficult to determine whether the copy is the privately copied contents or the authorized copied contents.

By the way, in this invention, the privately copied contents means the copy for local use and carried out by the person who has no dealership of the relevant source (digital contents), while the officially copied contents means the copy for global use and carried out by the person who has the dealership to the relevant source. That is, the officially copied contents are only able to be acquired by the means equivalent to the conventional contents sales, which include the sales from an electronic shopping mall on the Internet.

BRIEF SUMMARY OF THE INVENTION

Accordingly, it is an object of the present invention to provide an information reproduction device, an information recording device, and information selling device, and an information purchasing device, and an automatic information vending machine, which can increase demands for officially copied contents on the official market and build up the information distribution mechanism suited for interest of the contents provider, contents user, and electronic device manufacturer by changing over the reproduction system of the relevant contents by determining whether the contents are the officially copied contents or privately copied contents, and permitting more advantageous utilization form for the officially copied contents than for the privately copied contents.

According to the present invention, in order to solve the above-mentioned problems, by controlling the use of contents by license information corresponding to the contents and at the same time, pasting a digital signature to the license information corresponding to the encrypted contents, which is the officially copied contents, with a secret key of an public key cryptosystem which the contents selling server only knows, the officially copied contents and privately copied contents are determined by the presence of the digital signature, and the reproduction system of the contents are varied based on the judgment results.

The information reproduction device according to the present invention reproduces the contents information based on the license information required for reproducing the contents information added to the contents information and comprises a determining section configured to determine whether the encrypted contents information is officially copied contents information or privately copied contents information and a reproduction section for reproducing the contents information determined as the privately copied contents information with restrictions much severer than for the officially copied contents information.

It may be determined whether the contents are the officially copied contents information or privately copied contents information based on the verification information for verifying the officially copied contents contained in the license information.

The utilization condition of the contents information contained in the license information is more restricted for the privately copied contents information than for the officially copied contents information.

The license information added to the contents information may be encrypted or decrypted by the key information prepared based on the information dependent on the identifier of the recording medium in which the contents information is recorded.

The judging section may determine whether the contents information is the original contents pursuant to the contents of the license information, and if it is determined to be the original contents information, the second reproduction section for reproducing the contents information without restriction may be further included.

According to the information reproduction device of the present invention, a structural difference is provided in the reproduction system of privately copied contents as well as officially copied contents and original contents, and expansion of the personal use is prevented with privately copied contents admitted, thereby protecting the copyright and contents providers. In addition, if the contents are unjustly transferred to a separate recording medium, that is, copied, since the license information is dependent on the recording medium, the license information is unable to be decrypted from the illegal copying medium, and as a result, the contents are unable to be decrypted. Therefore, whether it is privately copied contents or officially copied contents, the license information must be remade for the copy, and because it is the just recording device that can do it (for example, that knows the function "f"), restriction to number of copies is accurately carried out, and unjust use of the contents are able to be prevented.

A first information recording device according to the present invention is an information recording device for recording the contents information (may be encrypted and may not be encrypted) and the license information (may include a decrypting key for the encrypted contents information) required for reproducing the contents information and added to the contents information, the information recording device comprising a determining section for determining the type of input contents information, a generating section for generating the license information based on the type determined by the determining section, the information dependent on the identifier of the recording medium, and a recording section for recording the contents information to the recording medium together with the license information generated by the creation section. The license generating section may generate the license information based on the utilization condition of contents information in addition to the type determined by the determining section and the information dependent on the identifier of recording medium.

The contents information to be input may be restricted to analog signals.

According to the first information recording device according to the present invention, discriminating the type of contents and providing the environment in which duplication is allowed only by the severe restrictions than the source contents differentiate the privately copied contents from the officially copied contents put on the official market and relatively increase the value of the officially copied contents, thereby contributing to the expansion of market of officially copied contents. In addition, when the contents are unjustly transferred to another media, that is, copied, since the license information is dependent on the media, for example, the license information is unable to be decrypted, and the license information must be re-generated for copying whether it is privately copied contents or officially copied contents, and this is only achieved by a proper recording device (for example, that knows the function "f"), and the number of copy times is able to be definitely restricted, and therefore, the unjust use is able to be prevented. Furthermore, restricting the recorded source contents to analog contents only can cause quality degradation of the contents every time duplication is made when the digital contents are recorded, and this could serve as the deterrent of duplication and at the same time relatively increase the value of officially copied contents, and thereby the sale market of the officially copied contents are able to be secured more definitely.

A second information recording device according to the present invention is an information recording device for recording contents information and license information added to the contents information and required for reproducing the contents information in a recording medium, comprising a generating section for generating the license information including verifying information for verifying that the license information is the officially copied contents based on the information dependent on the identifier of the recording medium and the utilization condition of the contents information, and a recording section for recording the contents information as well as the license information generated by the generating section to the recording medium.

The second information recording device is able to be used for the contents selling device and contents purchasing device for selling and purchasing the officially copied contents. For the license information, since the license information dependent on the recording medium is generated, whether it is the privately copied contents or officially copied contents, the license information must be re-generated for the copy, and the device allowed to do this is only the proper recording device (for example, that can know the function "f"), and the number of copies is able to be definitely restricted, and thereby unjust use is able to be prevented.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a diagram showing one example of data configuration of digital license information;

FIG. 2 is a diagram showing one example of data configuration of encrypted digital license;

FIG. 3 is a diagram showing one example of data configuration of license header contained in the digital license information;

FIG. 4 is a diagram showing one example of data configuration of contents utilization condition contained in the digital license information;

FIG. 5 is a diagram showing one example of data configuration of the analog license information;

FIG. 6 is a diagram showing one example of data configuration of digital signature;

FIG. 7 is a diagram showing one example of data configuration of the digital signature header contained in the digital signature;

FIG. 29 is a flowchart for explaining the original contents generating processing operation;

FIG. 30 is a diagram showing one example of data configuration of copied form information;

FIG. 31 is a diagram showing one example of data configuration of utilization condition information in the copied form information of FIG. 30;

FIG. 39 is a diagram showing one example of data configuration of purchase requesting information;

DETAILED DESCRIPTION OF THE INVENTION

Figure 8:
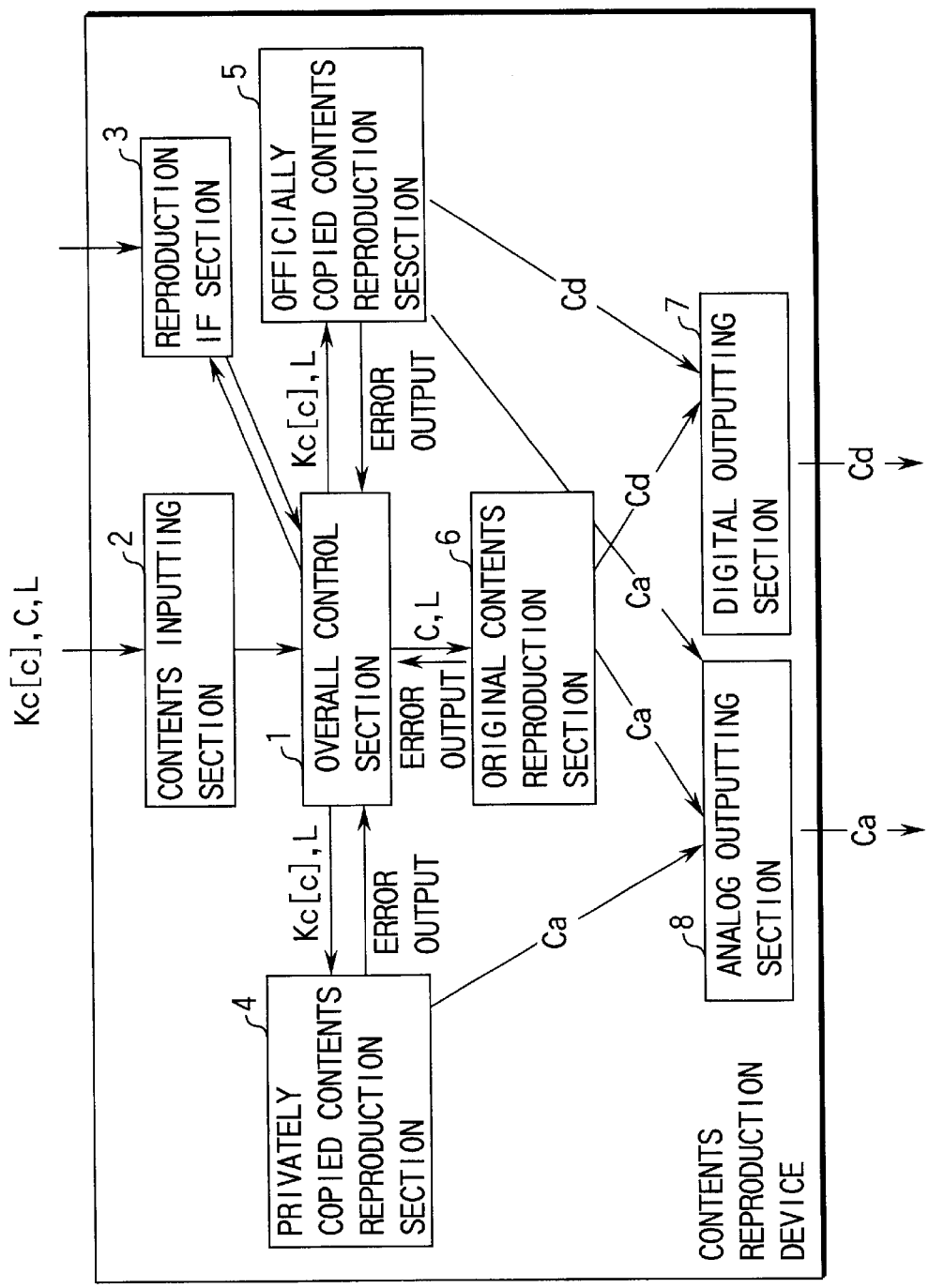
FIG. 8 is a diagram showing a configuration example of contents reproduction device of the first embodiment according to the present invention.

A preferred embodiment of an information recording/reproduction device according to the present invention will now be described with reference to the accompanying drawings.

First Embodiment

First, the terms used in the following description will be defined.

License information falls into two broad general categories: one to be embedded in the contents information itself and the external information related to the contents information as additional information. The former is achieved in the analog layer by an electronic water-mark technique, and is called the analog license information in this case. The latter is achieved in a digital layer and therefore called the digital license information. Furthermore, the two are jointly called the license information.

Contents can be classified into four kinds as shown in the table below: legacy contents, plain contents, or analog contents (hereinafter called the analog contents), original contents, officially copied contents for global use, and privately copied contents for local use.

TABLE 1

| Kind | Signature | Compression | Encryption | Medium-dependency |
|---|---|---|---|---|
| Officially Copied Contents | Yes | Yes | Yes | Yes |
| Privately Copied Contents | No | Yes | No | Yes |
| Original Contents | No | Yes | No | No |
| Plain Contents | No | No | No | No |

The original contents information is either the contents information of one's own work or the copy-free contents information with no specific restriction to use. Consequently, the original contents information is compressed but not encrypted, not medium-dependent (prevents free copy to other medium), free of digital signature, and with the addition of the digital license information with the license header only later discussed.

The officially copied contents information means the contents information encrypted by the person who possesses the selling right of the contents information. The officially copied contents information has not only the contents information compressed and encrypted but also has the addition of the digital license information with the digital signature that certifies the sales right. It is medium-dependent and is unable to be freely copied to other medium.

The privately copied contents information means the contents information copied by the person who has no selling right of the contents information. The privately copied contents information has the contents information compressed and encrypted as well as has the addition of digital license information only with the license header free of digital signature.

Next discussion will be made on the specific construction of the digital license information. The digital license information Lo comprises the license header (LH), contents key (Kc), contents utilization condition (U), certificator MAC, and digital signature.

The license header is data of fixed length comprising the length of license information shown in FIG. 3, contents identifier (ID), copy information, and contents key length. The length of license information shows the total length of the license information and is utilized when license is extracted. The copy information is the information for determining whether the contents information is original contents information, officially copied contents information, or privately copied contents information. The length of the contents key shows the length of contents key contained in the license information.

The contents utilization condition U in the digital license information shows the utilization condition of the contents information corresponding to the digital license information, and has the configuration shown in FIG. 4. In FIG. 4, the digital output flag Fe, when "1," permits the digital output of the contents information and does not permit when "0." The effective date information shows the effective date of the contents information. Similarly, the effective number of times shows the number of times in which the contents information is utilized. These are all data of fixed length specified by the system.

By the way, the digital license information shown in this specification is only an example, and are varied in various ways in accordance with application forms.

The certificator is the data for determining whether or not the contents key and contents utilization condition contained in the digital license information is correct, and has effects of error detection and tamper-proof.

The digital signature comprises a digital signature header and digital signature as shown in FIG. 6. The digital signature header comprises the total length (bit length) of the digital signature and the kind of the digital signature and the signature verification key No. as shown in FIG. 7.

Because the digital license information Lo contains the contents key Kc, it must be encrypted. However, on the other hand, encrypting all the digital license information gives rise to the need of decrypting only for acquiring the copy information or the need of encrypting those which originally do not need encryption such as the original contents information. To avoid this, in the present embodiment, a configuration that limits the scope of encryption only to the contents key, contents utilization condition, and certificator as shown in FIG. 2.

Hereinafter, the data in which the information I is encrypted by key K is expressed with I[K] or [K]I. For encrypting the digital license information and the contents information, the use of common key encryption is premised. The common key encryption is an encryption technology in which the encryption key and decryption key coincide. In the following embodiment, there are descriptions to encrypt with a decryption key or to decrypt with an encryption key depending on the context, but this does not contradict because of the foregoing reasons.

The encrypted digital license information has the structure as shown in FIG. 2 and the part excluding the license header and the digital signature is encrypted by the license key later described in detail.

Next description will be made on the analog license information. The analog license information is embedded in the contents information itself as the electronic water-mark, and since it is embedded in the reproduced plain contents information, it is still effective even if the copyright protection of the contents by encryption is broken. However, on the other hand, since the information is embedded in the contents information itself, it has a defect to take time for embedding.

Therefore, in the present embodiment, for the analog license information, the structure as shown in FIG. 5 is considered. That is, the analog license information La comprises the copy time restriction information and copy information, and the copy time restriction information indicates the upper limit value of the number of copies (no restriction included) of the contents information, and the copy information is the information same as the copy information contained in the license header LH of FIG. 3.

Hereinafter, as the first embodiment of the present invention, a contents reproduction device that determines whether the input digital contents information is at least officially copied contents information or privately copied contents information, and even original contents information according to circumstances based on the encrypted digital license information and varies the reproduction system of the contents based on the determination results.

Figure 12:
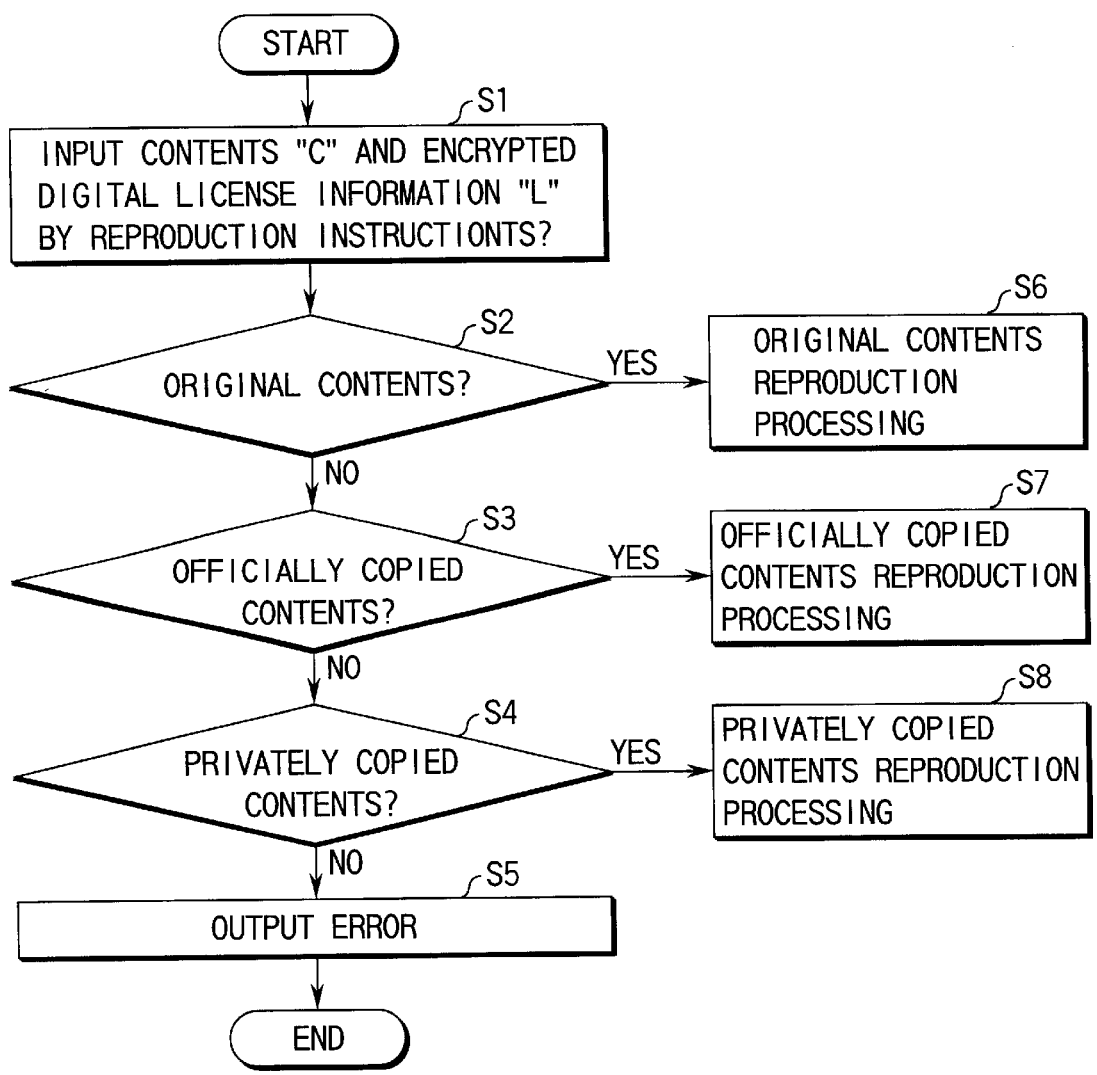
FIG. 12 is a flowchart for explaining the processing operation of the contents reproduction device of FIG. 8.

The overall configuration diagram of the contents reproduction device of the first embodiment according to the present invention is shown in FIG. 8 and the flow of processing is shown in the flowchart of FIG. 12. Referring now to the flowchart of FIG. 12, the contents reproduction device of FIG. 8 is described. For the contents information, the digital contents information (encrypted contents information (Kc[C]) or not encrypted contents information C) is input together with the encrypted digital license information L.

First of all, by the reproduction instruction from the reproduction interface (IF) section 3, contents information Kc[C] and encrypted digital license information L are input in the contents input section 2 (step S1). These pieces of information is sent to the whole control section 1, and referring here to the license header of the encrypted digital license information, whether the contents information is the original contents information or privately copied contents information, or officially copied contents information is determined (steps S2 to step S4). Based on the determination results, reproduction processing of the original contents information, reproduction processing of the privately copied contents information, and reproduction processing of the officially copied contents information is carried out (steps S6 to steps S8).

Because those which do not correspond to these three kinds of contents are contents which are unable to be interpreted in the contents reproduction device according to the present invention, an error output is generated, and processing is ended (step S5).

The reproduction processing for each contents information based on the three kinds is carried out in relevant reproduction sections 4, 5, and 6 of FIG. 8. These specific configuration and the flow of processing will be later described, but it is important to achieve a configuration in which the contents information is allowed to flow from the officially copied contents reproduction section 5 to both analog output section 8 and digital output section 7, but not allowed to flow from the privately copied contents reproduction section 4 to the analog output section 8 only. The analog output section 8 is defined to be of relatively low quality and to output under the non-compressed state, and to include not only analog signal outputs but also low-bit-rate digital signal output. The digital output section 7 is defined to be of relatively high quality and to output under the compressed state, and not to include analog signal output. That is, the privately copied contents information is allowed to be reproduced only for the purpose of local use, and with respect to the secondary utilization such as cutting and pasting part of the contents information, there is a high possibility for the user to deviate from the scope of the personal use and the contents provider is unable to permit. In the present invention, in view of this point, structural differences are provided for the method of reproducing the privately copied contents information and officially copied contents information, or original contents information, and by preventing expansion of the use of privately copied contents information while admitting the recording of the privately copied contents information, the copyright and the contents provider are protected.

Figure 9:
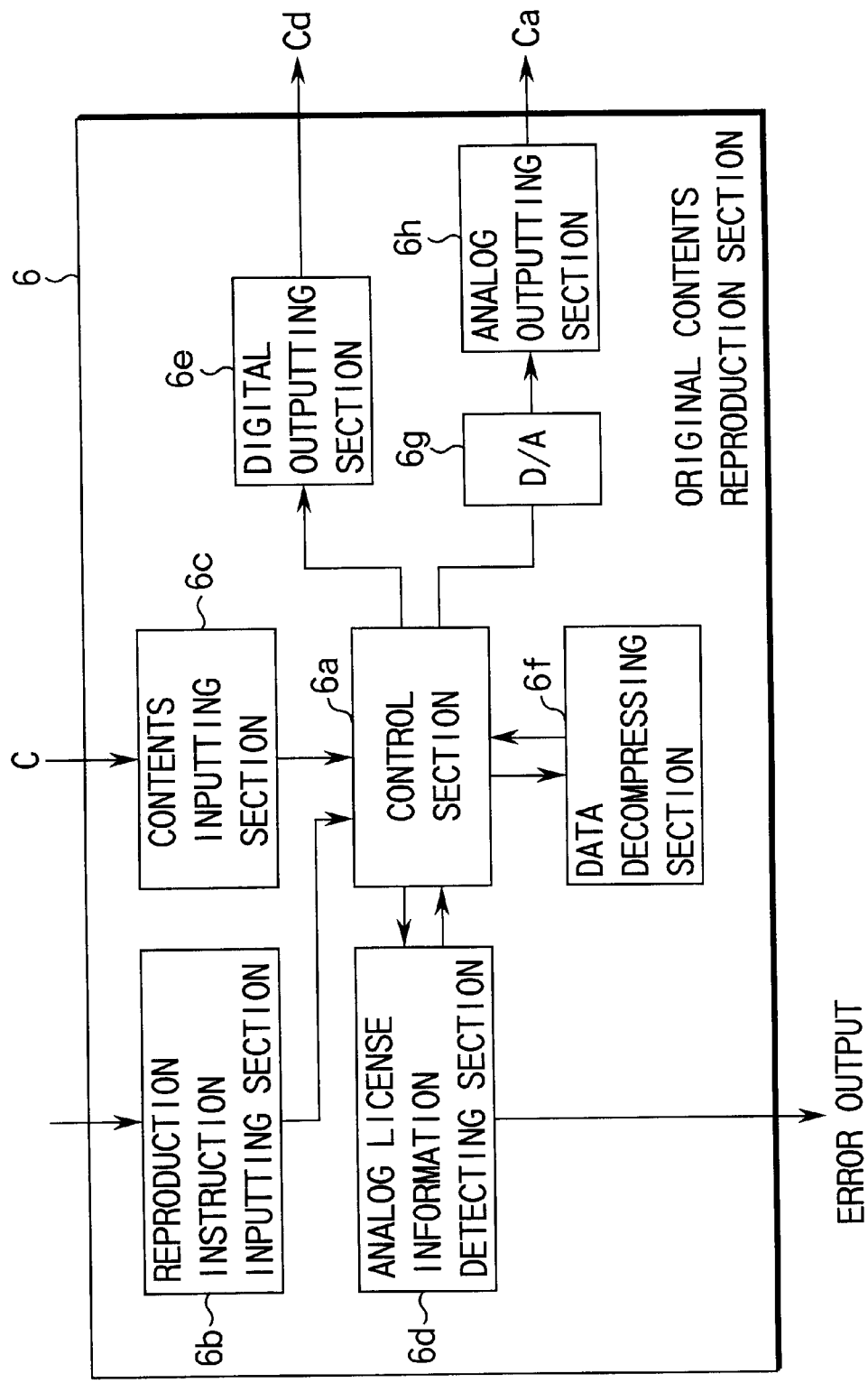
FIG. 9 is a diagram showing a configuration example of the original contents reproduction section of FIG. 8.
Figure 13:
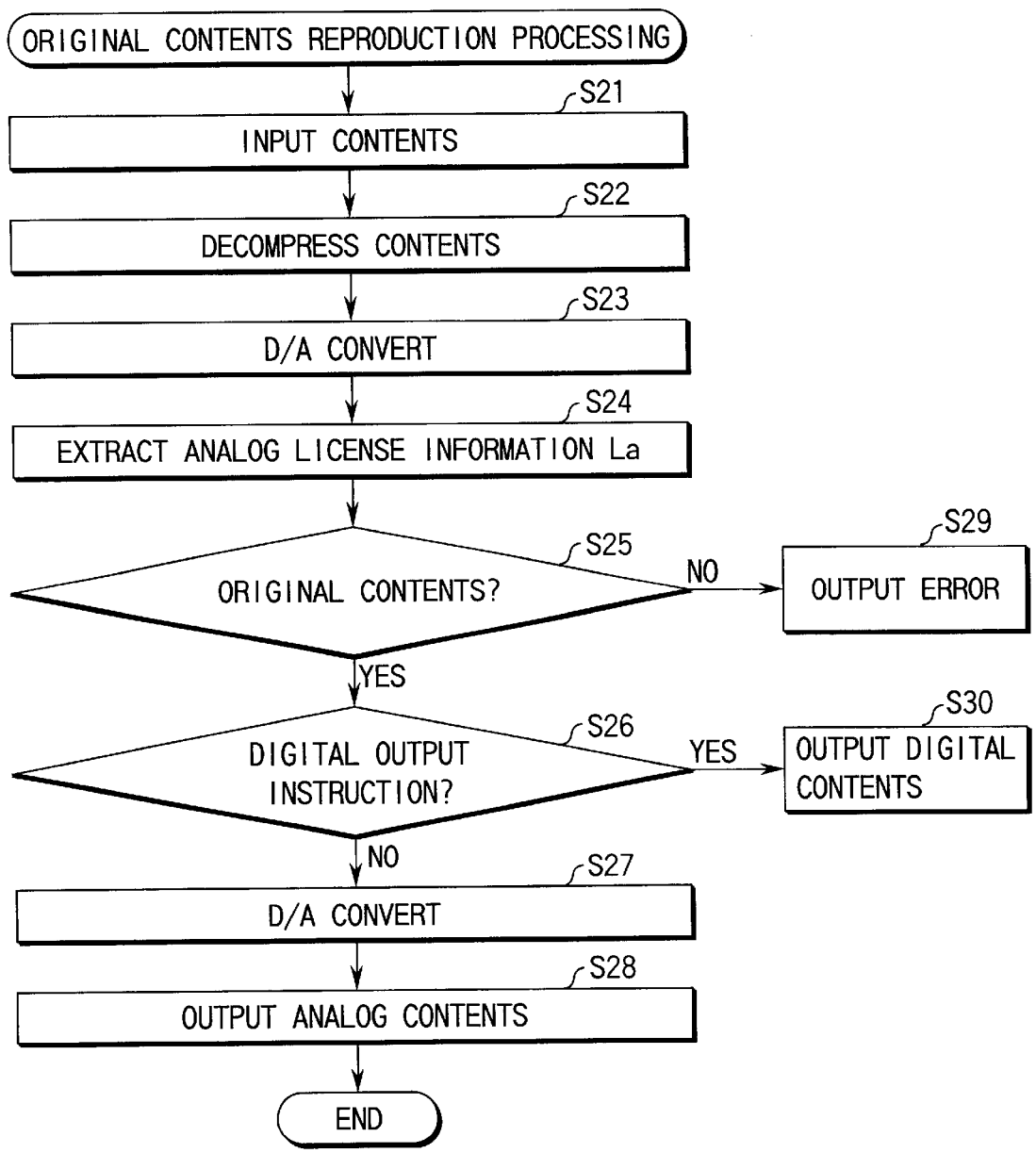
FIG. 13 is a flowchart for explaining the reproduction processing operation of the original contents.

The configuration diagram of the original contents reproduction section 6 of FIG. 8 is shown in FIG. 9, and the flow of the processing in FIG. 13. The original contents information is the non-encrypted contents information as described above, and is also referred to as the plain contents information. With respect to the license information, in the present embodiment, the digital license information comprises a license header only, and with respect to the analog license information, an unrestricted number of copies is set.

Referring now to the flowchart of FIG. 13, the reproduction section 6 of the original contents information of FIG. 9 is described.

The original contents information C is input in the contents input section 6c (step S21), the compression system such as MPEG, etc. is depressed or decompressed at the data decompressing section 6f (step S22), and the digital contents information C outputted as a result is converted from the digital signal to the analog signal (D/A conversion) at the D/A converting section 6g (step S23). And if the analog license information La embedded in the contents information is detected at the analog license information detecting section 6d (step S24), the control section 6a determines whether the contents information is the original contents information or not by referring to the copy information therein (step S25). If it is not the original contents information, the error is outputted and processing is ended at the moment (step S29). If it is the original contents information, the control section 6a determines whether the digital output instruction is provided or not. If the digital output instruction is provided (step S26), the digital signal Cd is outputted via the digital output section 6e (step S30), and otherwise, the digital contents information C is converted from the digital signal to the analog signal Ca at the D/A converting section 6g and outputted via the analog output section 6h (steps S27–S28).

Figure 10:
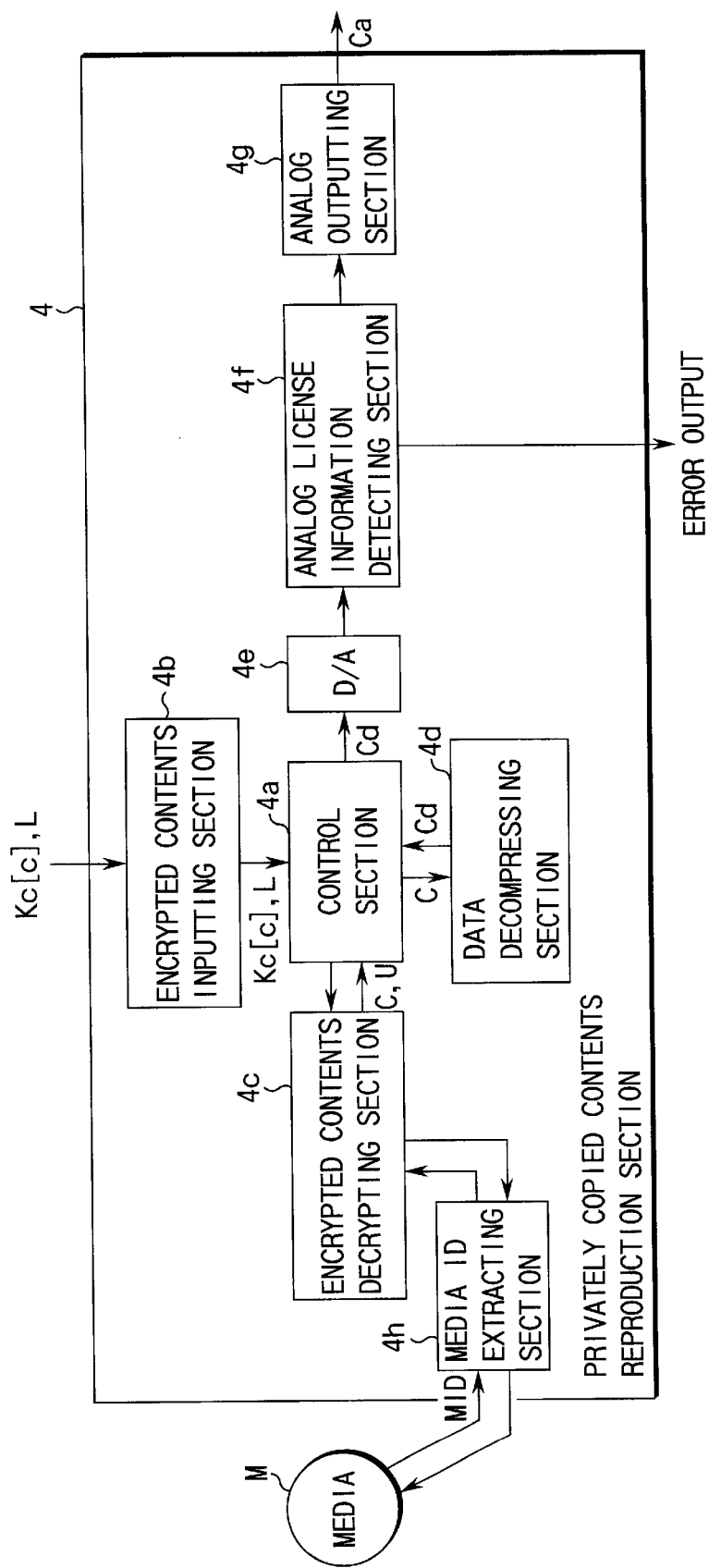
FIG. 10 is a diagram showing a configuration example of privately copied contents reproduction section of FIG. 8.
Figure 14:
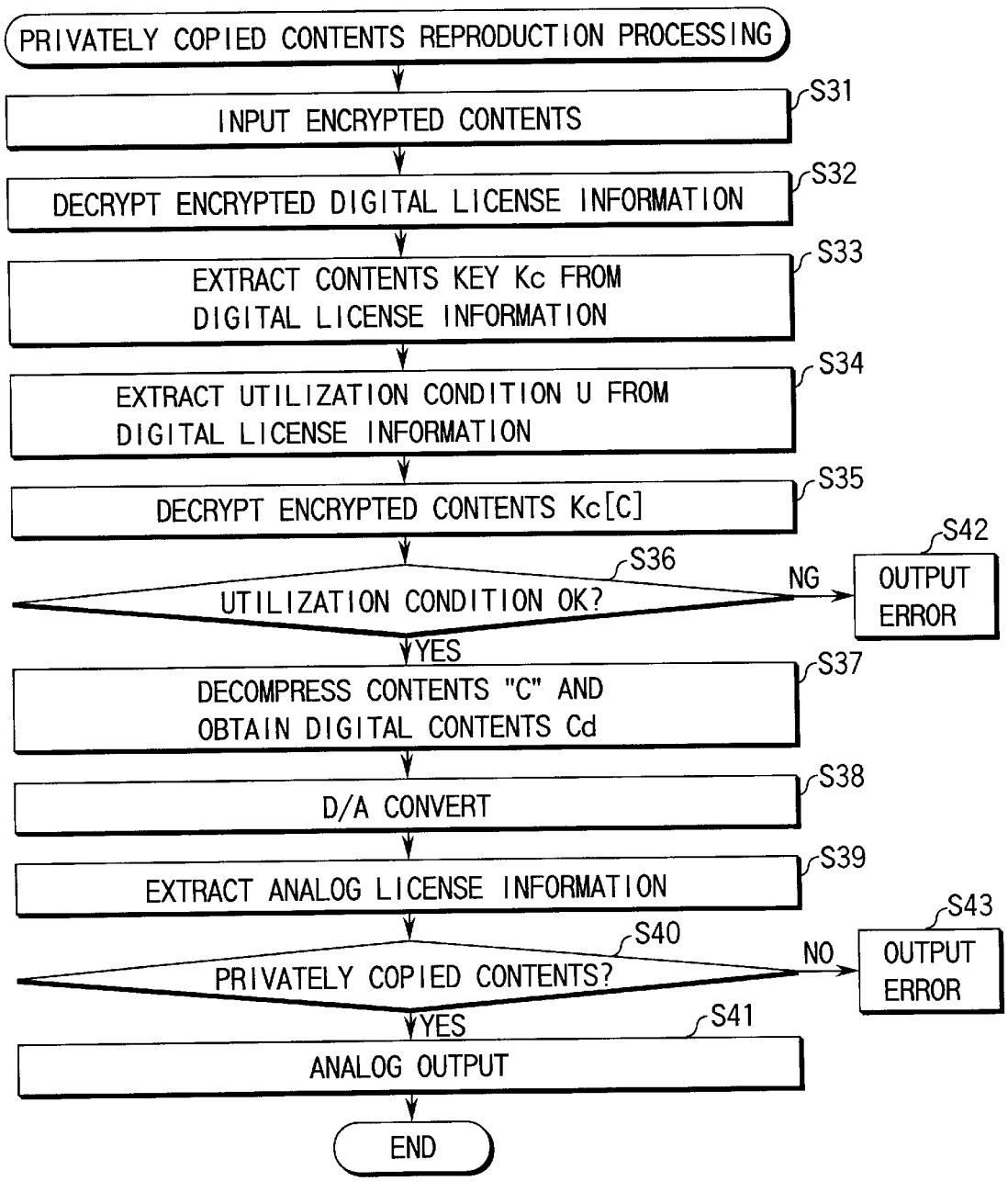
FIG. 14 is a flowchart for explaining the privately copied contents reproduction processing operation.

FIG. 10 shows the configuration diagram of the privately copied contents reproduction section 4 of FIG. 8 and FIG. 14 shows the flow of the processing. As described above, the privately copied contents information is the contents information which is encrypted and which does not contain the digital signature for certifying that it is the officially copied contents information in the digital license information.

Referring now to the flowchart of FIG. 14, the privately copied contents reproduction section 4 of FIG. 10 will be described in detail.

The privately copied contents information Kc[C] is input in the encrypted contents inputting section 4b together with the encrypted digital license information L (step S31). These pieces of information is sent to the encrypted contents decrypting section 4c, where the encrypted digital license information L is decrypted by the processing later described in detail (step S32), and the encrypted contents information Kc[C] is decrypted using the contents key Kc contained in the digital license information. In addition, from the digital license information, the utilization condition U is extracted (steps S33–S35).

The control section 4a checks the utilization condition U (step S36), and if it is determined inapplicable, it outputs the error and ends the processing (step S42). If it is determined applicable, the control section 4a determines whether the conditions stated in the utilization condition U deviate from the range (upper limit) permitted to the privately copied contents information or not. This is to cope with tampering etc. of the application conditions, and if it deviates, the control section 4a sets the condition to the upper limit value and advances to step S37, or outputs the error to end the processing (step S42). By doing this, it is able to cope with forgery of license information as a system.

The control section 4a feeds the decrypted contents information C to the data decompressing section 4d, decompresses the compression data such as MPEG data, etc., and outputs the digital contents information Cd (step S37). After the digital contents information Cd is converted from the digital signal to the analog signal by the D/A converting section 4e (step S38), the analog license information detecting section 4f detects the analog license information embedded in the contents information (step S39). The control section 4a determines whether the contents information is privately copied contents information or not by referring to the copy information in the analog license information (step S40). If it is not the privately copied contents information, the control section outputs the error and ends at the moment (step S43). If it is the privately copied contents information, it is D/A converted by the D/A converting section 4e and the analog contents information Ca is outputted via the analog output section 4g (step S41). By the way, even if the digital output instruction is provided, the digital output is not carried out.

Figure 11:
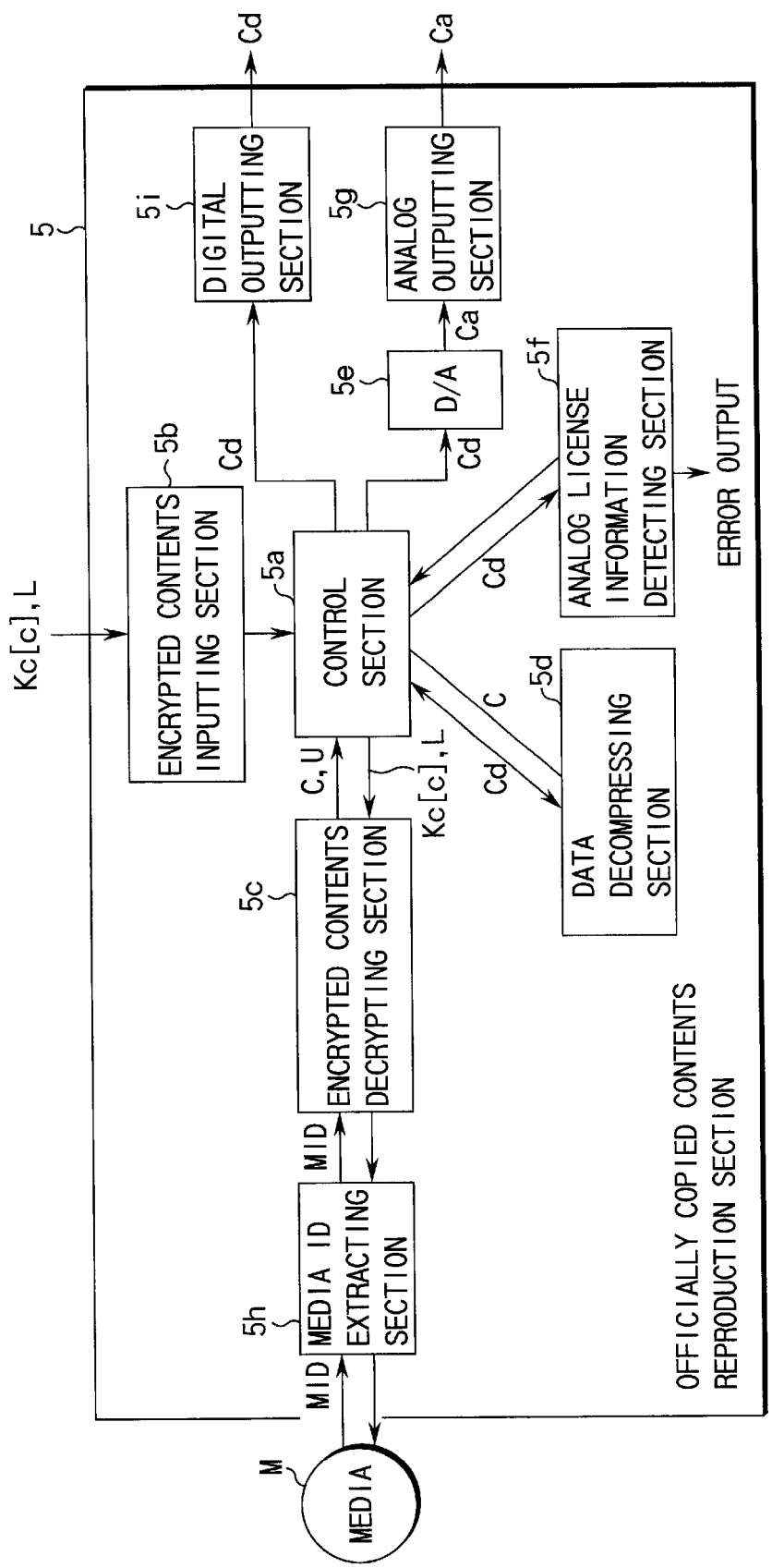
FIG. 11 is a diagram showing a configuration example of officially copied contents reproduction section.
Figure 15:
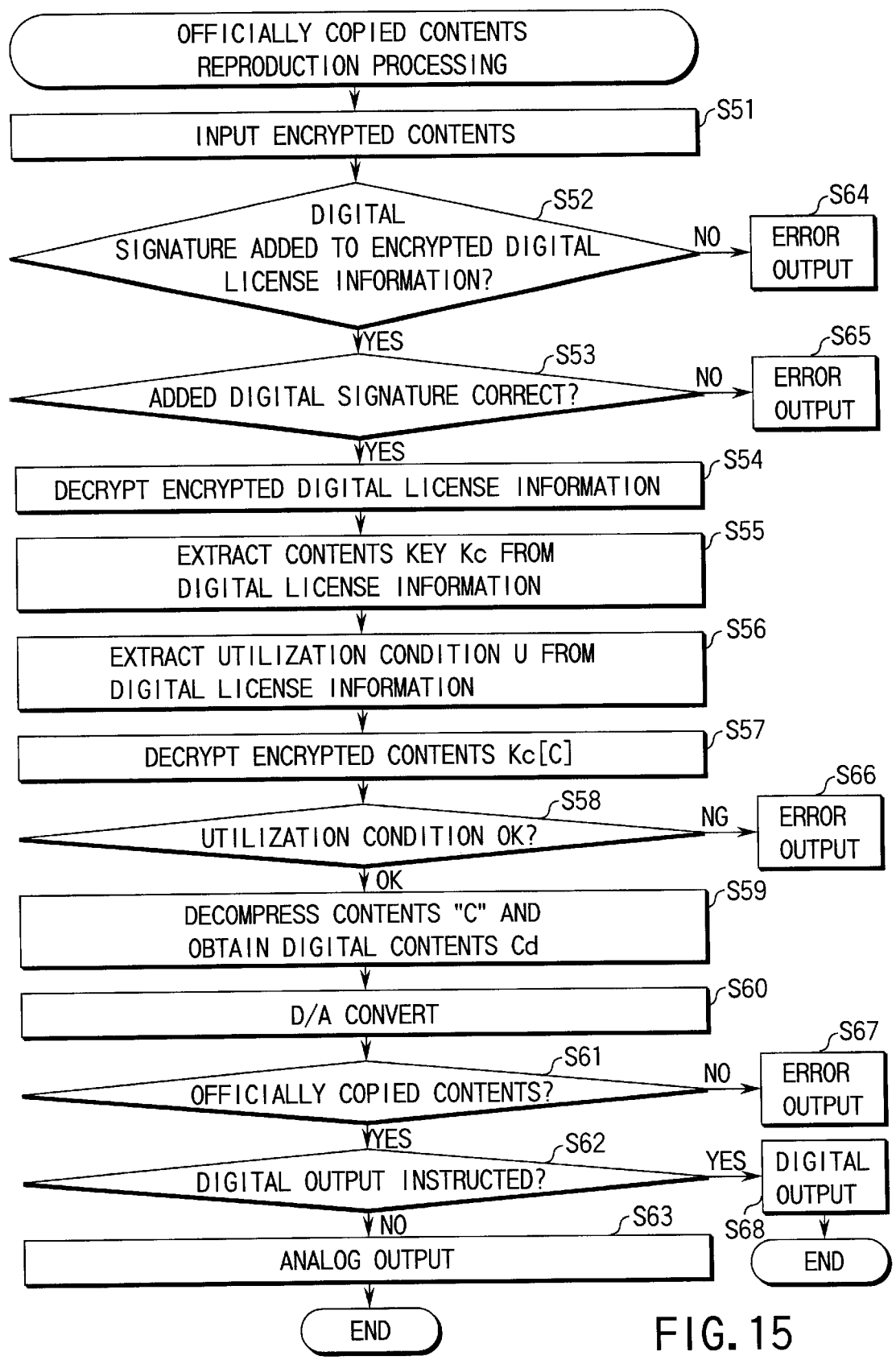
FIG. 15 is a flowchart for explaining the officially copied contents reproduction processing operations.

FIG. 11 shows the configuration diagram of the officially copied contents reproduction section 5 of FIG. 8 and FIG. 15 shows the flow of the processing. As described above, the officially copied contents information is the contents information which is encrypted and which contain the digital signature for certifying that it is the officially copied contents information in the digital license information.

Referring now to the flowchart of FIG. 15, the officially copied contents reproduction section 5 of FIG. 11 will be described in detail.

The officially copied contents information Kc[C] is input in the encrypted contents inputting section 5b together with the encrypted digital license information L (step S51). These pieces of information is sent to the encrypted contents decrypting section 5c, where the encrypted digital license information L is verified whether the digital signature is added to the encrypted digital license information by the processing later described in detail, and if it is added, the information is verified for the officially copied contents information by verifying the digital signature using the digital signature verification key (steps S52–S53). If the digital signature is not added in step S52, or if the digital signature is not verified in step S53, the error is outputted and processing is ended (steps S64–S65).

If the digital signature is able to be verified at step S53, the encrypted digital license information is decrypted by the processing later described in detail (step S54) and the encrypted contents information is decrypted using the contents key Kc included in the digital license information. In addition, the utilization condition U is extracted from the digital license information (steps S55–S57).

The control section 5a checks the utilization condition U (step S58), and if it is determined inapplicable, it outputs the error and ends the processing (step S66). If it is determined applicable, the control section 5a determines whether the conditions stated in the utilization condition deviate from the range (upper limit) permitted to the privately copied contents information or not. If it deviates, the control section sets the condition to the upper limit value and advances to step S59, or outputs the error to end the processing. By doing this, it is able to cope with forgery of license information as a system.

The control section 5a feeds the decrypted contents information C to the data decompressing section 5d, decompresses the compression data such as MPEG data, etc., and outputs the digital contents information Cd (step S59). After the digital contents information Cd is D/A converted by the D/A converting section 5e (step S60), the analog license information detecting section 5f detects the analog license information embedded in the contents information. The control section 5a determines whether the contents information is officially copied contents information or not by referring to the copy information in the analog license information (step S61). If it is not the officially copied contents information, the control section outputs the error and ends at the moment (step S67). If it is the officially copied contents information, when the digital output instruction is provided (step S62), the digital contents information Cd is D/A converted via the digital outputting section 5i (step S68), and if not, the digital contents information Cd is D/A converted by the D/A converting section 5e and the analog contents information Ca is outputted via the analog output section 5g (step S63).

Next description is made on the encrypted contents decrypting sections 4c, 5c contained in the privately copied contents reproduction section 4 (FIG. 10) and the officially copied contents reproduction section 5 (FIG. 11). This configuration section exists in the privately copied contents reproduction section 4 and officially copied contents reproduction section 5, and both have similar configurations. First, discussion will be made on the encrypted contents decrypting section 5c of the officially copied contents reproduction section 5, and with respect to the encrypted contents decrypting section 4c of the privately copied contents reproduction section 4, the difference from the encrypted contents decrypting section 5c only will be discussed.

Figure 16:
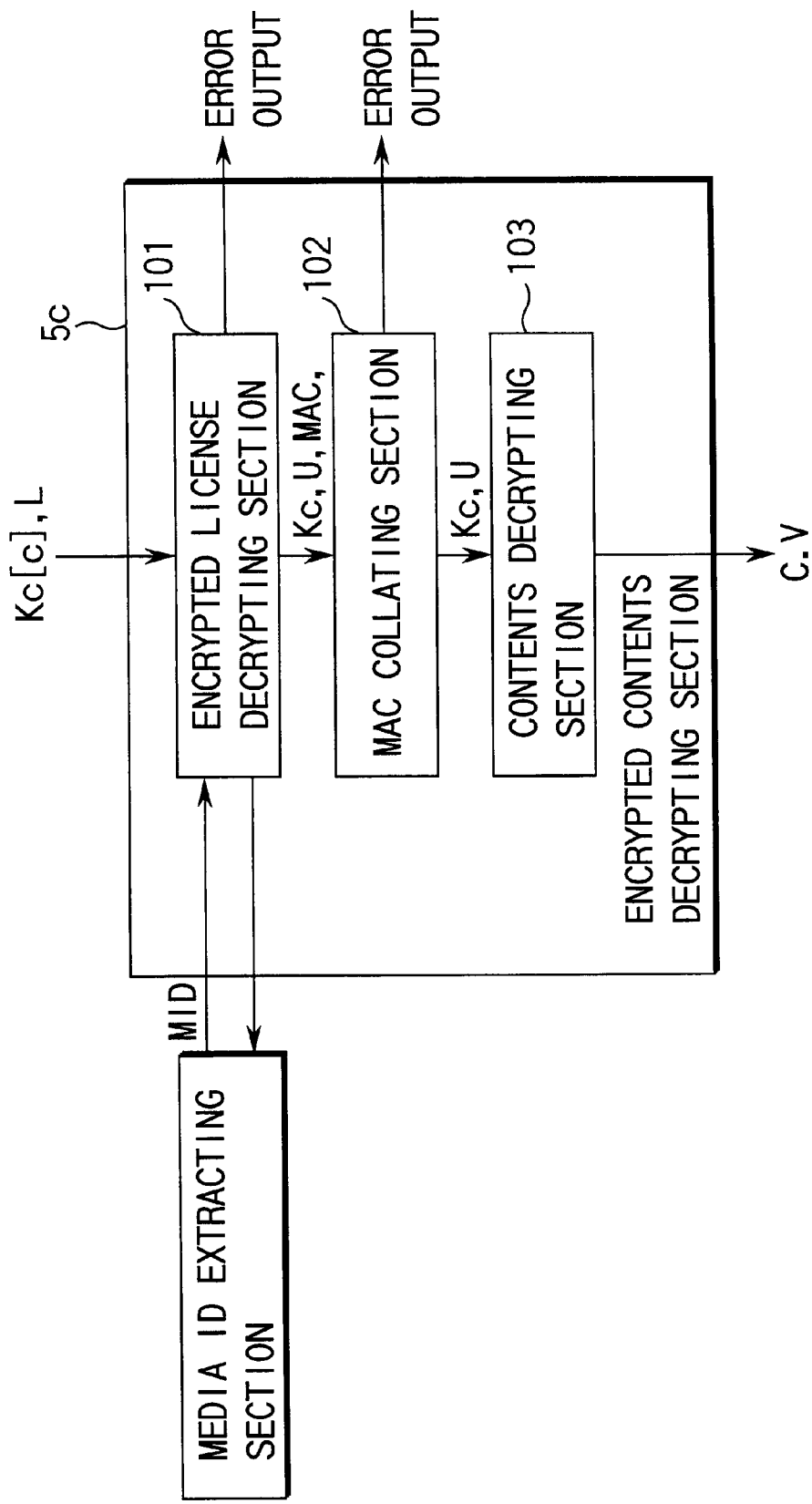
FIG. 16 is a diagram showing a configuration example of encrypted contents decrypting section included in the officially copied contents reproduction section of FIG. 11.
Figure 18:
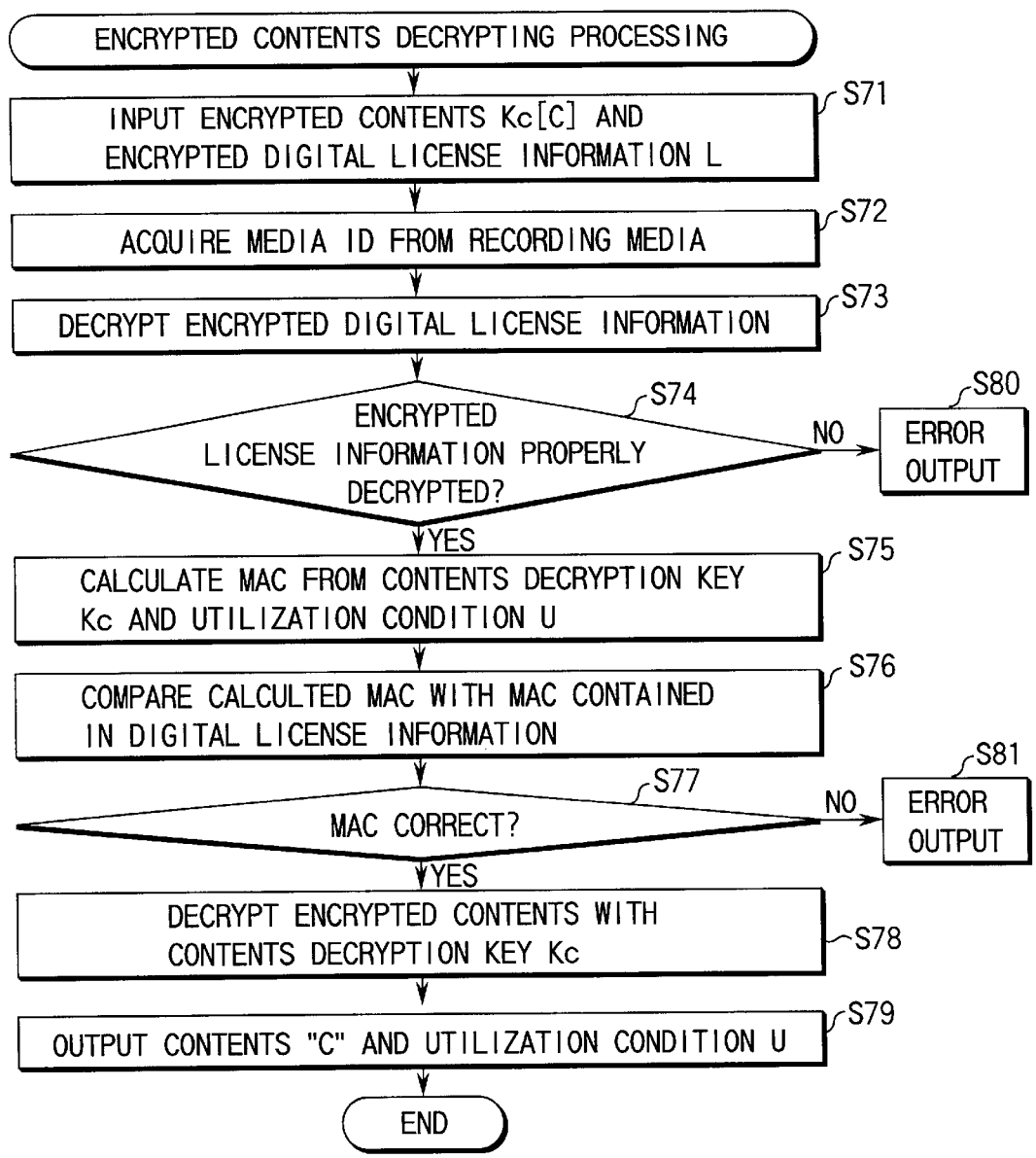
FIG. 18 is a flowchart for explaining the encrypted contents decrypting processing operation.

FIG. 16 shows a configuration example of the encrypted contents decrypting section 5c and FIG. 18 shows the flow of the processing. Referring now to the flowchart of FIG. 18, the encrypted contents decrypting section 5c is described.

When the decrypted contents information Kc[C] and decrypted digital license information L are inputted to the encrypted license decrypting section Sc (step S71), at the encrypted license decrypting section 5c, the media ID, which is the identifier of media M in which the contents information is recorded is acquired through the media ID extracting section (in the case of the officially copied contents reproduction section 5, through media ID extracting section 5h and in the case of the privately copied contents reproduction section 4, through media ID extracting section 4h) (step S72). Using the media ID, a license decrypting key w is prepared by the section later discussed in detail, and the decrypted digital license information is outputted (step S73).

Of the digital license information shown in FIG. 1, the certificator is calculated from the contents key Kc and the contents utilization condition U (step S75). The certificator should be such a value that an output of one-directional function to which the information concatenating, for example, the contents key with the contents utilization condition are inputted.

The role of the certificator in this event is to detect the error so that the erroneous contents decryption key or utilization condition due to the erroneous license key w is not outputted. Generation of the certificator is achieved by the one-directional function. The one-directional function is able to be achieved by the hash function or encryption function, and is the function which is unable to estimate the input value from the output value.

The MAC collating section 102 collates the certificator calculated from the output of the encryption license decrypting section 101 with the certificator MAC originally contained in the digital license information of FIG. 1 also outputted from the encryption license decrypting section 101 (step S76), determines that the outputted contents decryption key Kc is reliable if they coincide (step S77), and using this Kc, decrypts the encrypted contents information by the contents decrypting section 103 (step S78). If the certificators do not coincide, the error is outputted to end the processing (step S81).

When the certificators are collated and the encrypted contents information is decrypted, the contents information C and the utilization condition U are outputted, and processing of the encrypted contents decrypting section is ended (step S79).

Figure 17:
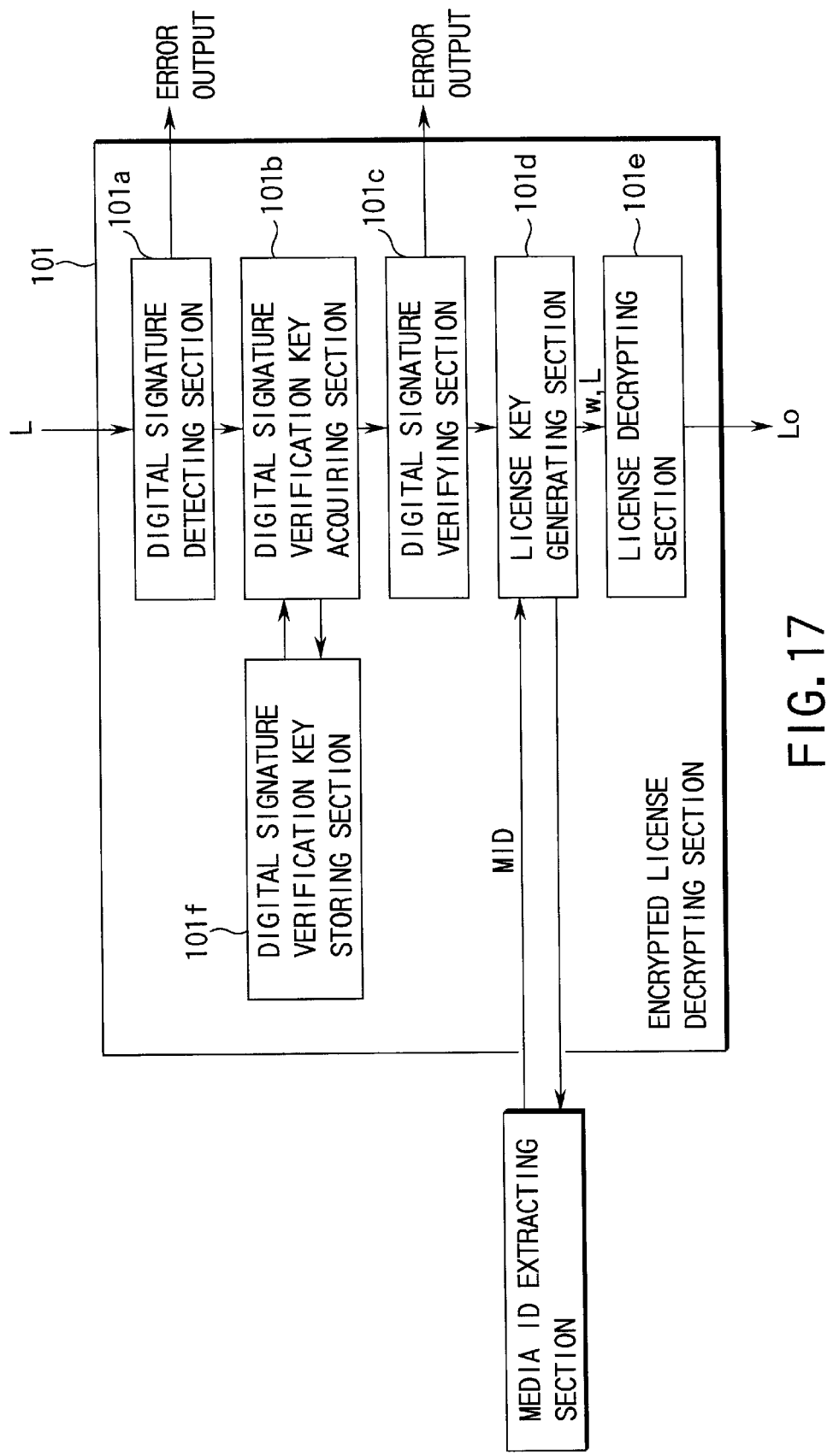
FIG. 17 is a diagram showing a configuration example of encrypted license decrypting section included in the encrypted contents decrypting section of FIG. 16.

Next discussion is made in detail on the encrypted license decrypting section 101, which is a component element of the encrypted contents decrypting section 5c. The configuration is shown in FIG. 17 and the flow of the processing is shown in FIG. 19.

Figure 19:
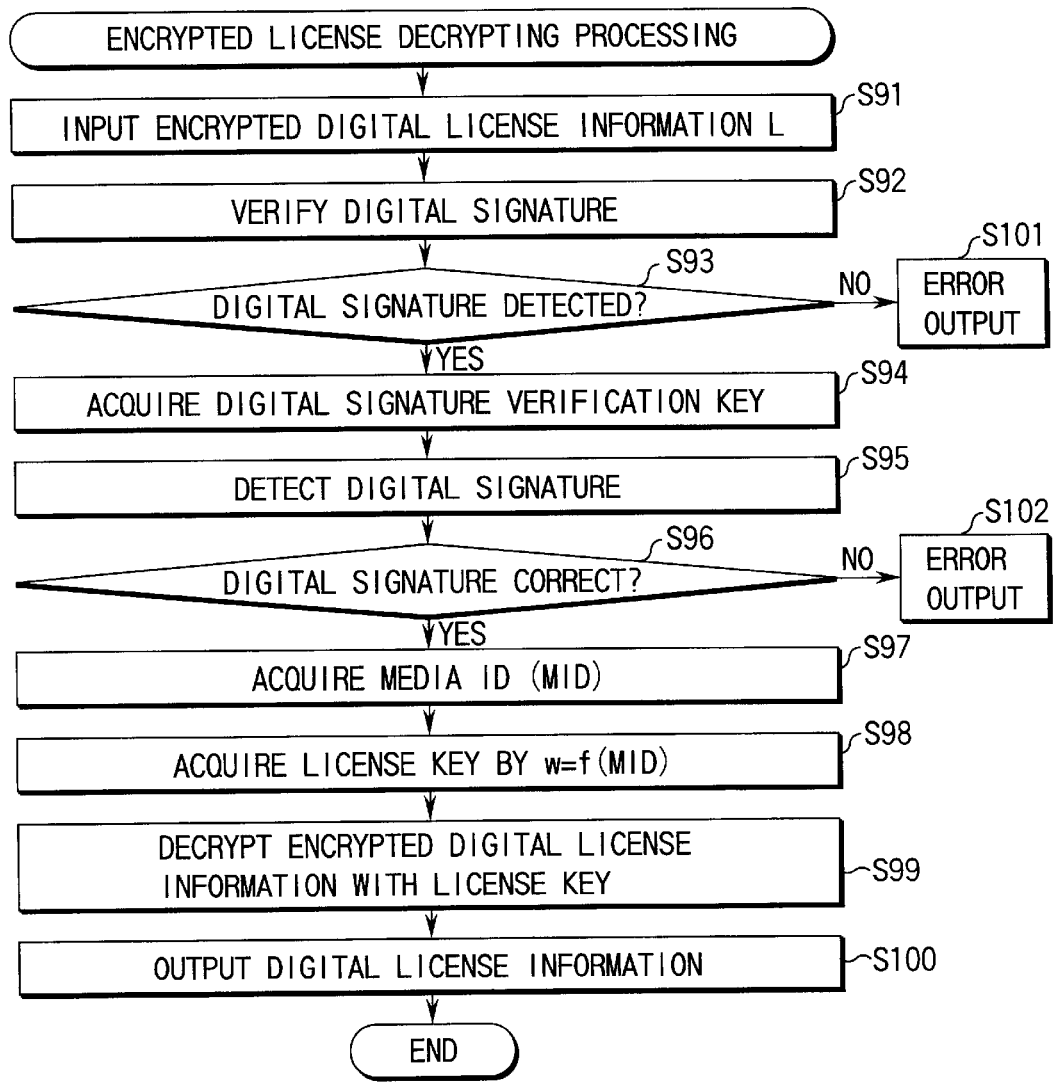
FIG. 19 is a flowchart for explaining the encrypted license decrypting processing operation.

Referring now to the flowchart shown in FIG. 19, the encrypted license decrypting section 101 is described.

When the encrypted digital license information L is inputted (step S91), first, at the digital signature detecting section 101a, detection of the digital signature takes place (step S92). That is, the digital signature is detected by the use of the data in the license header, for example, using the following formula, the head address of the digital signature is calculated.

Head address of the digital signature
=head address of the encrypted digital license information
+(license header length+contents key length+length of contents utilization condition+length of certificator)

The digital signature verification key acquiring section 101b acquires the fixed-length digital signature header from the head address of this digital signature (see FIGS. 6 and 7), and based on the total length of the digital signature stated in it, kind of signature, and number of signature detection key, the signature algorithm and the verification key are specified. When the kind of signature and the number of signature verification key are acquired, based on this, the digital signature verification key storing section 101f is searched, and the kind of the signature, signature algorithm corresponding to the number of the signature verification key, and the verification key are acquired (step S94).

When the digital signature (header) is unable to be detected, the error is outputted and processing is ended (steps S93, S101).

When the digital signature is detected, then, the digital signature verifying section 101c verifies the detected digital signature by the use of the signature algorithm specified by the digital signature header and the signature verification key of the signature verification key number (step S95).

The digital signature here is assumed to be the signature by the public key cryptosystem. That is, the authorized server or distributor with the signature creation key (secret key) only is able to generate the license file that corresponds to the officially copied contents information. Even if any one other than those possesses a reproduction device, what exists in the reproduction device is the signature verification key (public key) only. Because the difficulty to find the secret key from the public key guarantees the safety of the public key cryptosystem, the use of the sufficiently safe public key cryptosystem can prevent the creation of the digital signature corresponding to the third party who does not know the secret key. This guides to the notion in that the party that can generate the license corresponding to the officially copied contents information is the authorized distributor. However, on the other hand, the public key cryptosystem is not always safe because of the development of the attack method (deciphering method). In view of this, it is constructed to specify and change the signature algorithm and signature verification key as required in the header of the digital signature.

When the signature verification result is determined to be NG in the digital signature verifying section 101c, the error is outputted (steps S96, S102). Otherwise, the license key generating section 101d acquires the media ID (MID) of the media in which the encrypted contents information is recorded (step S97), and using the function "f" secretly held in the reproduction device, the license key w dependent on the media is obtained from the equation:

$$w=f(MID)$$

(step S98).

This is a mechanism for preventing decryption of the encrypted digital license information and as a result disabling the decryption of the contents information because only the license key w dependent on the media is obtained when the contents information is transferred to other media, that is, when the contents information is copied.

In this way, whether it is the privately copied contents information or officially copied contents information, for copying, the encrypted digital license information must be re-generated, but since the device that can achieve this is a proper recording device that knows the function "f", restriction to the number of copies is definitely carried out, and the unjust use is thereby prevented. In this sense, it is desirable that the hardware or firmware that realizes the function "f" exists in tamper-proof LSI.

The license decrypting section 101e decrypts the encrypted digital license information using the license key w generated in this way (step S99), obtains and outputs the digital license information Lo (step S100).

This completes description of the encrypted contents decrypting section 5c of the officially copied contents decrypting section 5 and the encrypted license decrypting section 101 which is the component element. The encrypted license decrypting section 101 of the encrypted contents decrypting section 4c of the privately copied contents reproduction section 4, and the digital signature detecting section 101c of FIG. 17, digital signature verification key acquisition section 101b, digital signature verification key storing section 101f, and digital signature verification section 101c are not required as configuration and processing of these is not required.

Next description is given on several variations of the contents reproduction device discussed above.

First of all, in the overall configuration of FIG. 8, a case in which the reproduction section that is different in accordance with the type of contents information is installed completely independently is shown, but this is not always required. Practically, reproduction processing varies in accordance with the type of the license file, but as described above, there are many parts in which processing is similar. Consequently, bringing the parts which carry out the same processing to one circuit can reduce the circuit scale. Conversely, even in the circuit which has the same functions, changing specifications for each reproduction section can improve the safety. For example, using a different algorithm for each kind of contents information in the data decompressing sections 4d, 5d, and 6f, respectively, of each reproduction section makes it difficult to falsify the kind of contents information by tampering the license information.

A configuration of the reproduction device that does not have the original contents reproduction section 6 is able to be considered. In such event, the original contents information is unable to be reproduced on the reproduction device side, and the contents information is limited to two kinds: officially copied contents information and privately copied contents information. By doing this, there is a problem in that the self-made contents information is regarded as the privately copied contents information, but on the other hand, there can be avoided the problem of recording and unconditionally reproducing non-self-made contents information such as dubbing of contents information from radio or TV.

Figure 20:
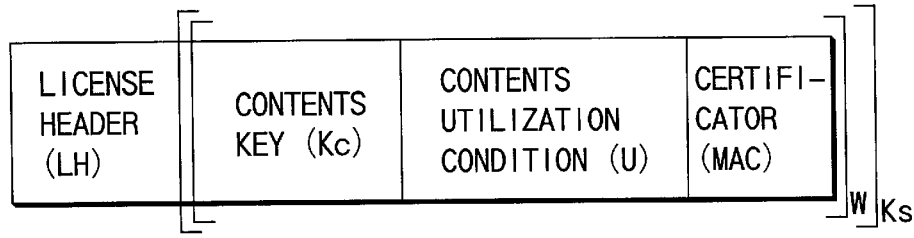
FIG. 20 is a diagram showing other example of encrypted digital license information, where the digital signature is not externally added.

With respect to the digital signature, in addition to adding the license information as in the case of FIG. 1, a form to carry out double encryption and affix the signature may be accepted, in which encryption is carried out by the signature creation key Ks after encryption by the license key w is carried out. The determination whether decryption is properly carried out or not is definitely made by the certificator MAC so that decryption is unable to be properly carried out even in the configuration as shown in FIG. 20, or whether the contents information is decrypted by different signature creation key or with a correct signature verification key. By doing this, the data size of the digital signature can be reduced.

According to the first embodiment, it is possible not only to control the use of encrypted contents information by the license information corresponding to the encrypted contents information but also to provide a system for discriminating the officially copied contents information from privately copied contents information by the presence of the digital signature, for changing the reproduction form of the contents information based on the discrimination results, and for reproducing in more advantageous mode for the officially copied contents information than the privately copied contents information by pasting signature with the secret key of the public key cryptosystem which only the contents selling server authorized to sell the contents information knows to the license information corresponding to the encrypted contents information, which is the officially copied contents information. Consequently, it is possible to prevent expansion of personal use and to protect the copyright and the contents provider while permitting the privately copied contents information. In addition, when the contents information is unjustly transferred to another recording medium, that is, copied, since the license information is dependent on the recording medium, for example, the license information is unable to be decrypted, and as a result, the contents information is unable to be decrypted. Consequently, whether it is the privately copied contents information or the officially copied contents information, for the copy, the license information must be re-generated, and it is only the just recording device which knows, for example, the function "f" that can re-generate the license information, and the restriction to the number of copies is able to be definitely exercised, and thereby the unjust use can be prevented.

Other embodiments of the information recording and reproducing device according to the present invention will be described. The same portions as those of the first embodiment will be indicated in the same reference numerals and their detailed description will be omitted.

Second Embodiment

The reproduction device according to the first embodiment previously described premises to have plural kinds of contents information, and requires a recording device for generating the plural kinds of contents information, and as the second embodiment, the contents recording device is described. The present embodiment may be integrated with the reproduction device of the first embodiment to form a contents recording/reproduction device.

Figure 21:
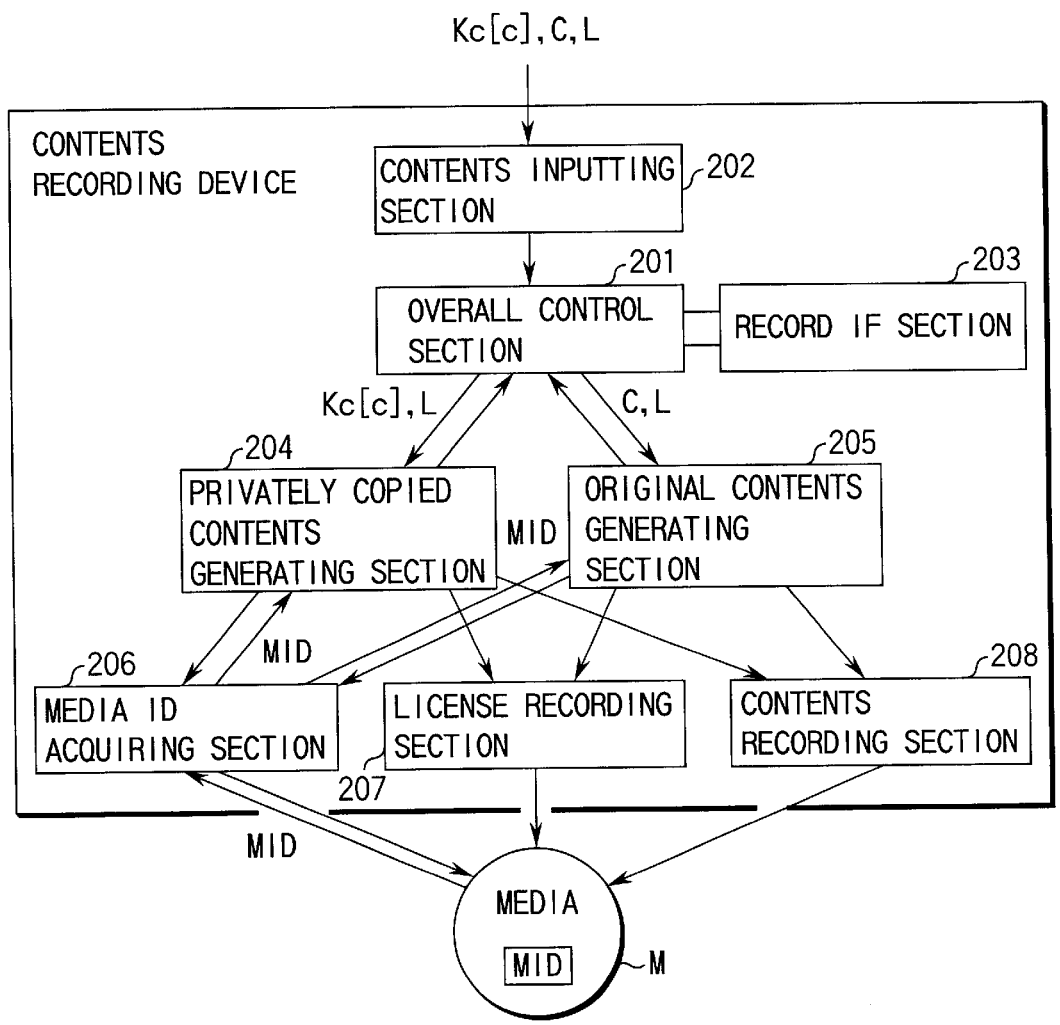
FIG. 21 is a diagram showing a configuration example of the contents recording device of the second embodiment according to the present invention.
Figure 24:
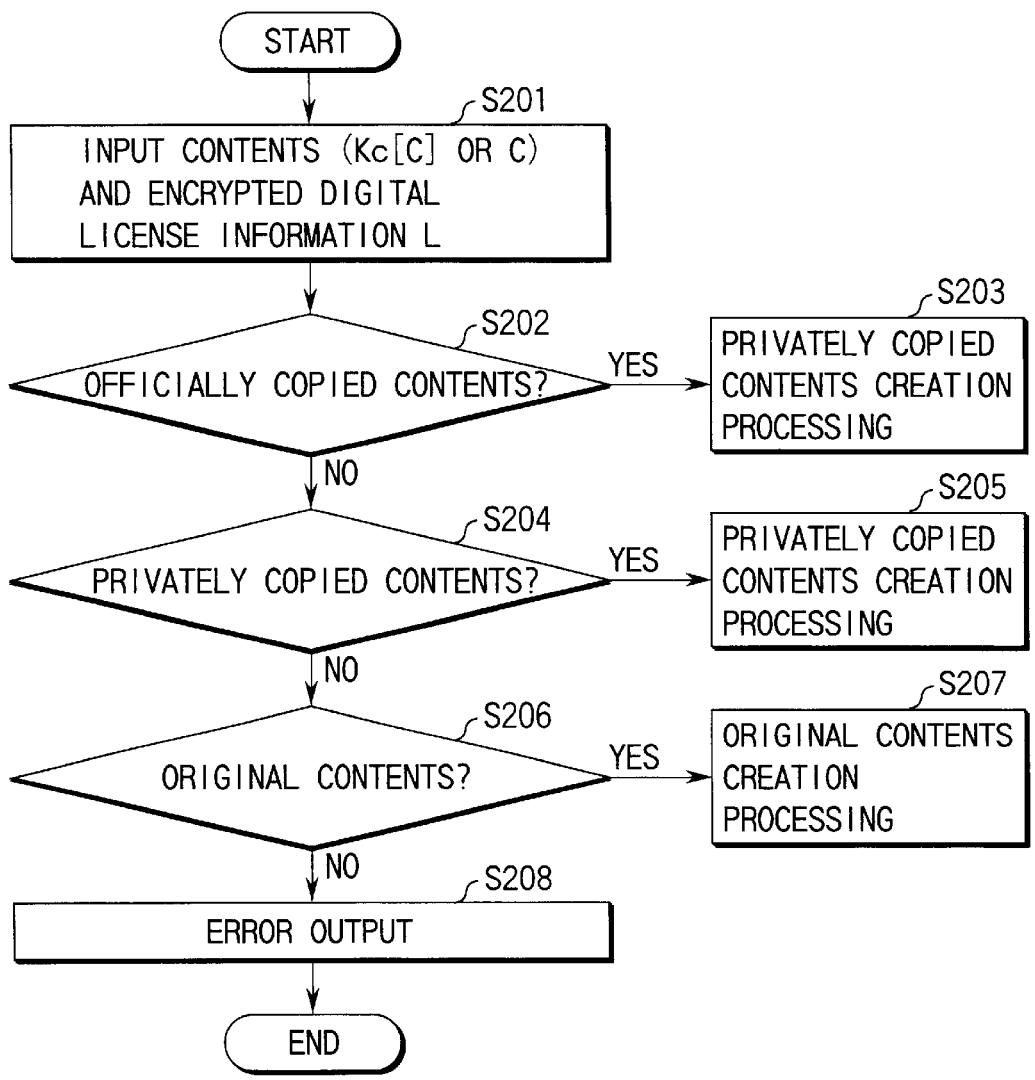
FIG. 24 is a flowchart for explaining the processing operation of the contents recording device of FIG. 21.

The overall configuration of the contents recording device related to the present embodiment is shown in FIG. 21, and the processing flow is shown in the flowchart of FIG. 24. Referring now to the flowchart of FIG. 24, the contents recording device of FIG. 21 is described.

To the contents input section 202, the encrypted contents information (Kc[C]) or non-encrypted contents information C is input together with the encrypted digital license information L as the contents information (step S201).

The overall control section 201 determines the kind of the contents information referring to the license header of the encrypted digital license information (steps S202, S204, S206). If the contents information is the officially copied contents information (Yes of step S202), the overall control section 201 sends these data to the privately copied contents generating section 204 and advances to the privately copied contents creation processing (step S203).

If the contents information is the privately copied contents information (Yes of step S204), the overall control section 201 sends these data to the privately copied contents generating section 204 and advances to the privately copied contents creation processing (step 205).

If the contents information is the original contents information (Yes of step S206), the overall control section 201 sends these data to the original contents generating section 205, and begins original contents generating processing (step S207).

By changing the recording technique in accordance with the kind of contents information as described above and providing the environment in which at most the privately copied contents information only is generated in the recording device, the officially copied contents information put on the formal market and the privately copied contents information is differentiated, and the value of the officially copied contents information is increased relatively, thereby contributing to the expansion of the market of the officially copied contents information.

Figure 22:
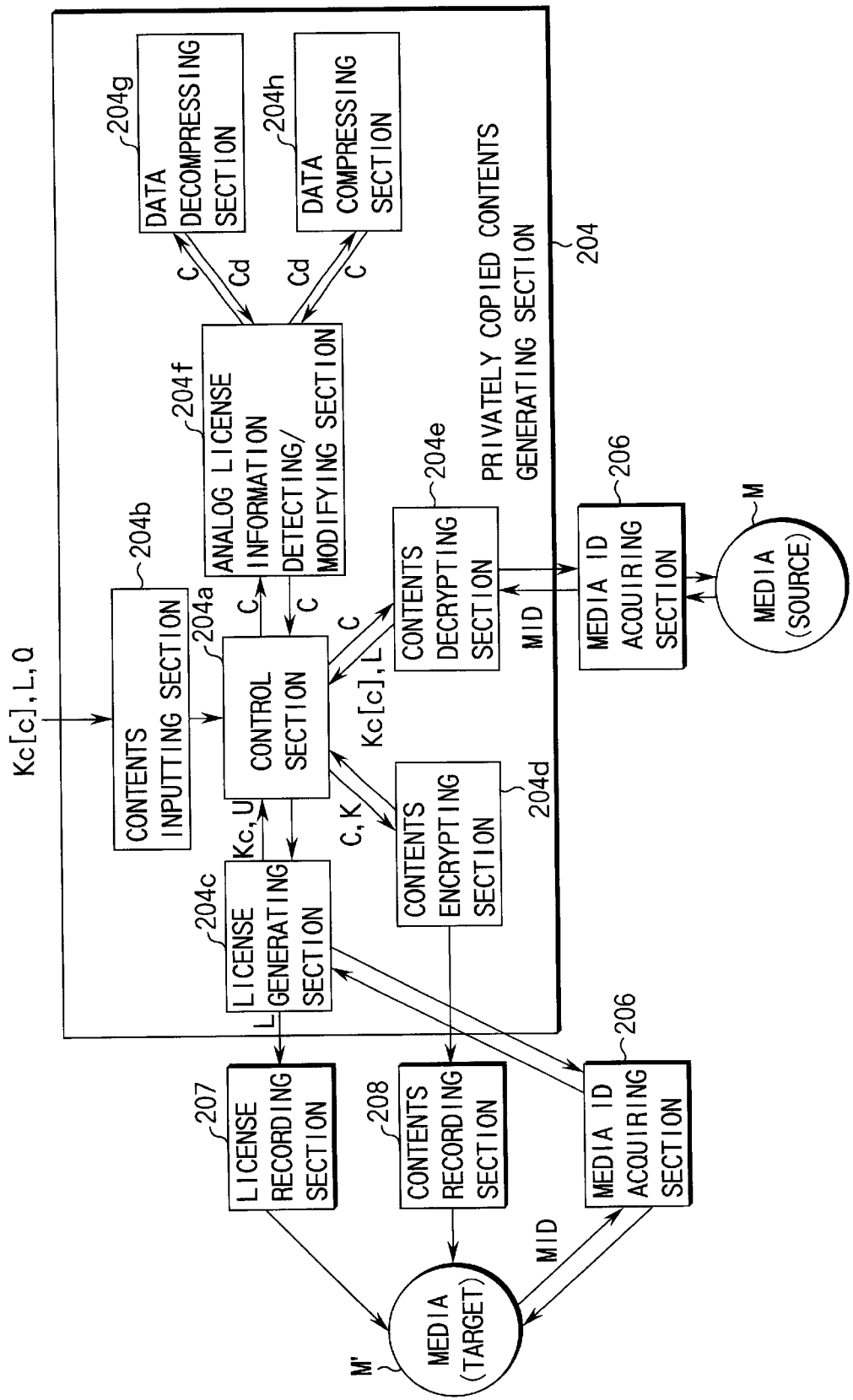
FIG. 22 is a diagram showing the configuration example of privately copied contents generating section of FIG. 21.

Next, the privately copied contents generating section 204 of the contents recording device of FIG. 21 is described in detail. FIG. 22 shows a configuration example of the privately copied contents generating section 204 and FIGS. 25 and 26 show a flow of the processing.

Figure 25:
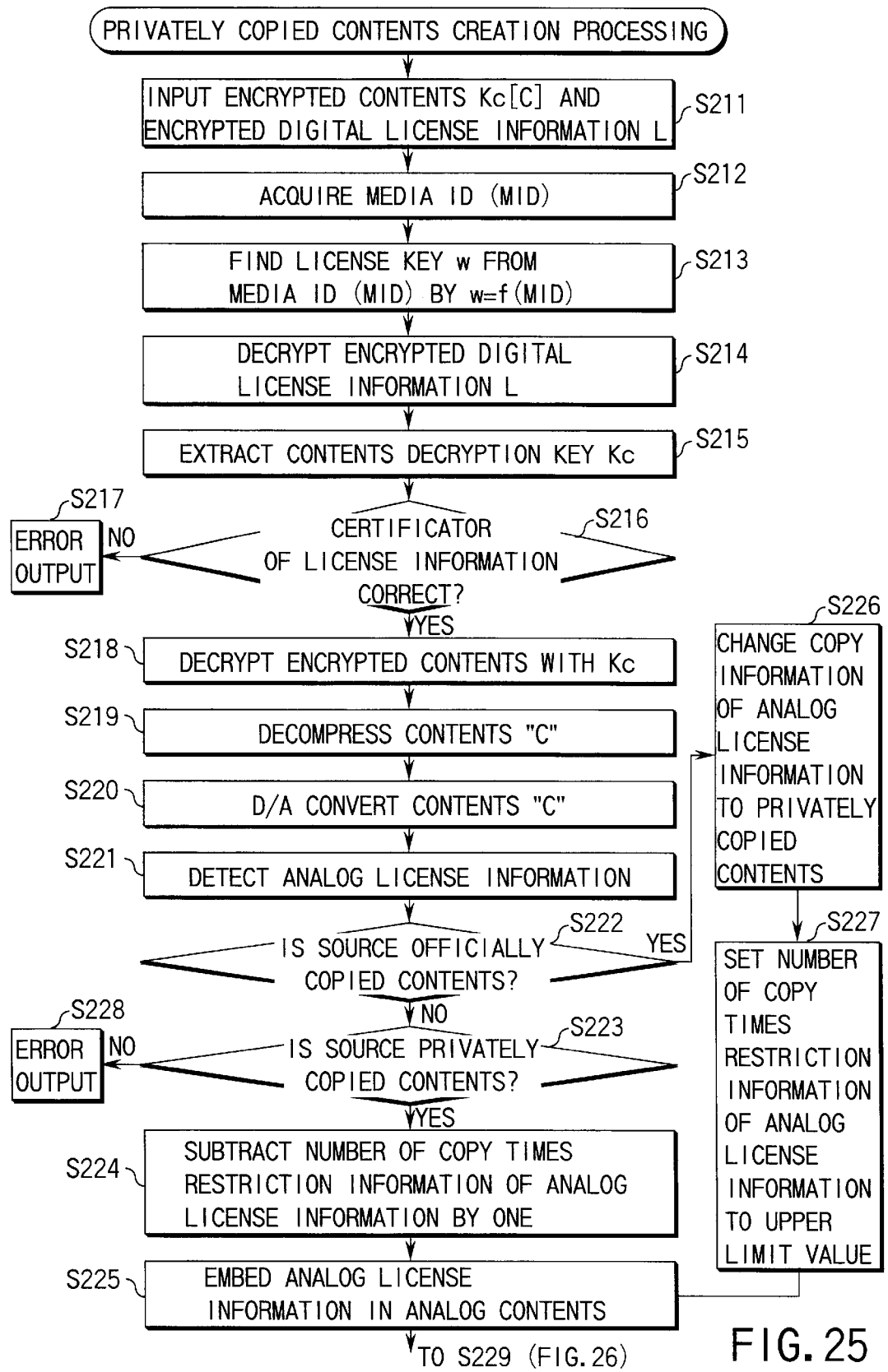
FIG. 25 is a flowchart for explaining the privately copied contents generating processing operation.
Figure 26:
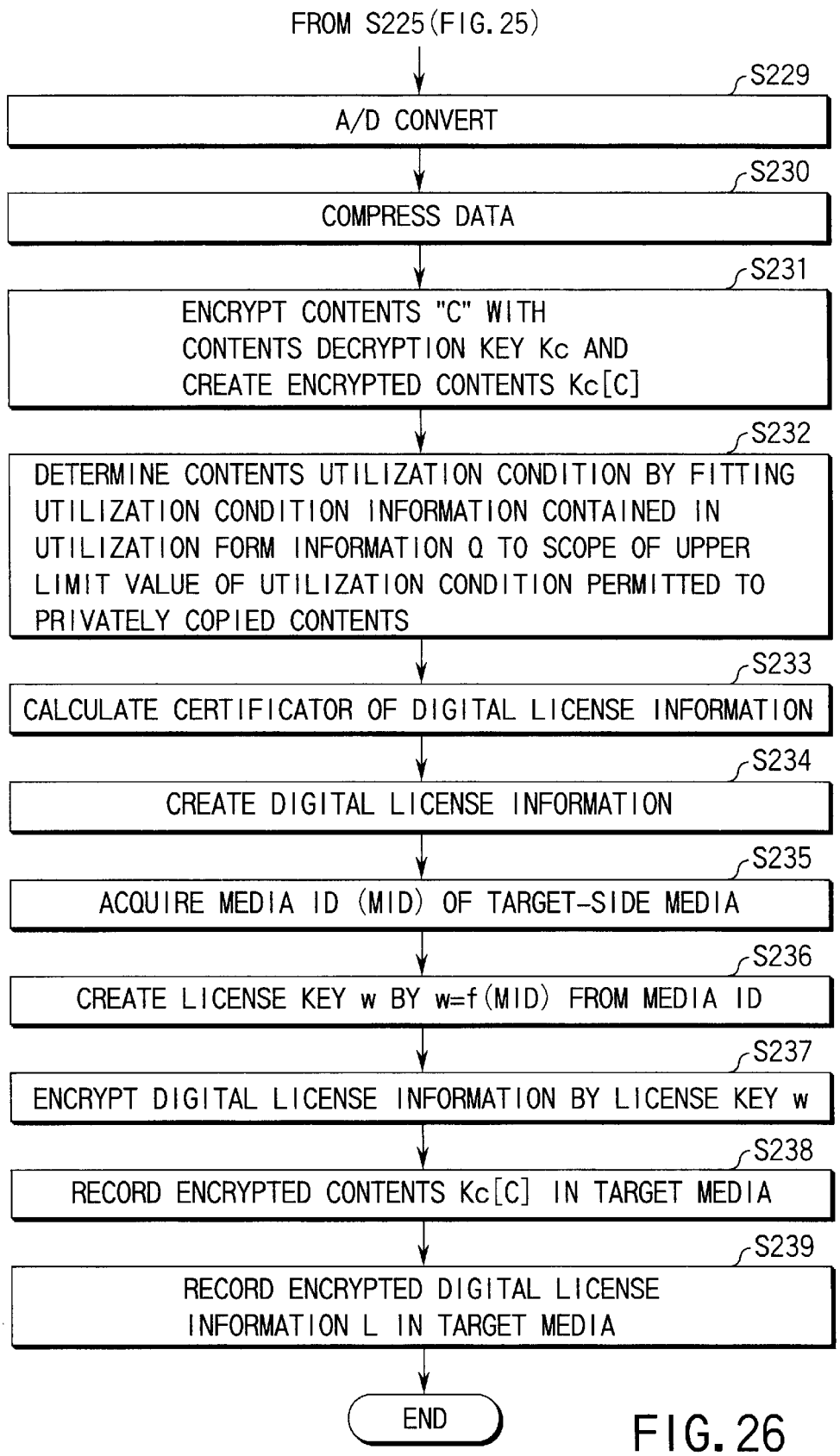
FIG. 26 is a flowchart for explaining the privately copied contents generating processing operation.

Referring now to the flowcharts shown in FIGS. 25 and 26, the privately copied contents generating section 204 is described.

When the privately copied contents information is recorded (copied), first of all, the encrypted contents information Kc[C], the encrypted digital license information L, and copy form information Q are input from the contents input section 204b, and processing begins (step S211).

The copy form information Q has a structure shown in FIG. 30. That is, in the copy form information Q, the category of contents information after the copy (category of copied contents information) and utilization condition of the copied contents information (utilization condition information) are stated.

Now, the utilization condition information has a structure shown in FIG. 31, comprises a digital output flag Fe, effective date information, effective number of use information, and number of copy restricting information, which are information to be embedded in the information stated in the digital license information and analog license information, respectively.

As will be clear in the following processing, these pieces of information is not always reflected as they are in accordance with the category of the contents information after copy. As described later, each upper limit value of the utilization condition is specified in accordance with the category of contents information after copy as discussed later, and it is not allowed to set the utilization condition exceeding the upper limit value. By doing this, privately copied contents information, officially copied contents information, and original contents information is discriminated for the use, and a system suited for profits of the contents provide is materialized.

Now, the inputted encrypted contents information Kc[C] and the encrypted digital licensing information L, and copy form information Q are sent to the control section 204a, and the encrypted contents information Kc[L] the encrypted digital license information L are sent to the contents decrypting section 204e.

At the contents decoding section 204e, same as contents reproduction of the contents reproduction device according to the first embodiment, the encrypted contents information is decrypted. That is, the media ID (MID) is acquired from the media M on the source side through the media ID acquiring section 206 (step S212), and using the media ID and hidden function "f", a license key w is generated at step S213 from a relational formula of $$w=f(MID)$$

and the encrypted digital license information L is decrypted (step S214). From the decrypted digital license information, the contents decryption key Kc is extracted (step S215). In addition, from the digital license information, a certificator is extracted, and by verifying the certificator, the contents decryption key Kc is checked for freedom of error (step S216). And using the contents decryption key Kc, the encrypted contents information is decrypted, and the contents information C is obtained (step S218).

The contents information C decrypted by the contents decrypting section 204e is sent to the analog license detection/modifying section 204f via the control section 204a. Here, first of all, the contents information C is sent to the data decompressing section 204g, where compression of the contents information C is depressed (step S219), and the depressed digital contents information C is D/A converted (step S220), and the analog contents information Ca is obtained. From this analog contents information Ca, the analog license information is extracted (step S221), and the kind of the contents information is specified by the copy information of the analog license information.

If the contents information of the source is the officially copied contents information (step S222), the copy information of the analog license information as shown in FIG. 5 is modified as the privately copied contents information (step S226), and, similarly, the number of copy restriction information of the analog license information is set to the upper limit value permitted to the privately copied contents information (step S227).

On the other hand, if the contents information of the source is the privately copied contents information (step S223), the number of copy restriction information of the analog license information is subtracted by one (step S224).

If the contents information of the source is neither the officially copied contents information nor the privately copied contents information, the error is outputted (step S228).

The analog license information presently recorded is erased and the analog license information generated in the foregoing processing is embedded in the analog contents information instead (step 225). Further, after it is A/D converted to the digital contents information Cd (step S229), the contents information is sent to the data compressing section 204h and undergoes the compression processing (step S230), and new contents information C is obtained.

The new contents information C is sent to the contents encrypting section 204d together with the contents encryption key Kc from the analog license information detecting/modifying section 204f via the control section 204a.

At the contents encrypting section 204d, the inputted contents information C is encrypted by the inputted contents decrypting key, and the decrypted contents information Kc[C] is obtained (step S231).

On the other hand, the control 204a refers to the digital output flag, effective date information, and number of effective use restriction stated in the utilization condition information of the copy form information Q, and make sure these conditions do not deviate from the range of the privately copied contents information. If it deviates, the contents utilization condition U is generated in such a manner that it can be contained in the digital license information in the range authorized in the privately copied contents information (step S232).

Next, the certificator MAC is calculated from the contents decryption key Kc and the contents utilization condition U (step S233). The computation method is the same as the computation carried out for confirming the certificator by the contents reproduction device of the first embodiment previously discussed.

Furthermore, to the part of the copy information of the license header, the information of the privately copied contents and others are calculated and stored, and the digital license information of the contents are completed.

Then, for encryption of the digital license information, from the target side (recording side) media M', the media ID (MID) is acquired through the media ID acquiring section 206 (step S235). From the acquired media ID (MID), the license key w is generated at step S236 by w=f(MID)

This creation system is the same as the creation system of the license key generated for the encrypted digital license information L discussed for the processing of the contents decrypting section 204e previously discussed. However, since MID differs from the case of the former, a different license key is generated.

By changing the data of the encrypted digital license information before and after the copy in this way, illegal copy is able to be prevented (even when the data is simply copied to other medium, it is unable to be decrypted).

Using the license key w obtained in step S236, the digital license information Lo is encrypted and the encrypted digital license information L is obtained (step S237).

With the foregoing, all the data to be recorded are completed, and the encrypted contents information Kc[C] and encrypted digital license information L are recorded in the target-side media M' via the contents recording section 208 and the license recording section 207, respectively (steps S238–S239).

Figure 23:
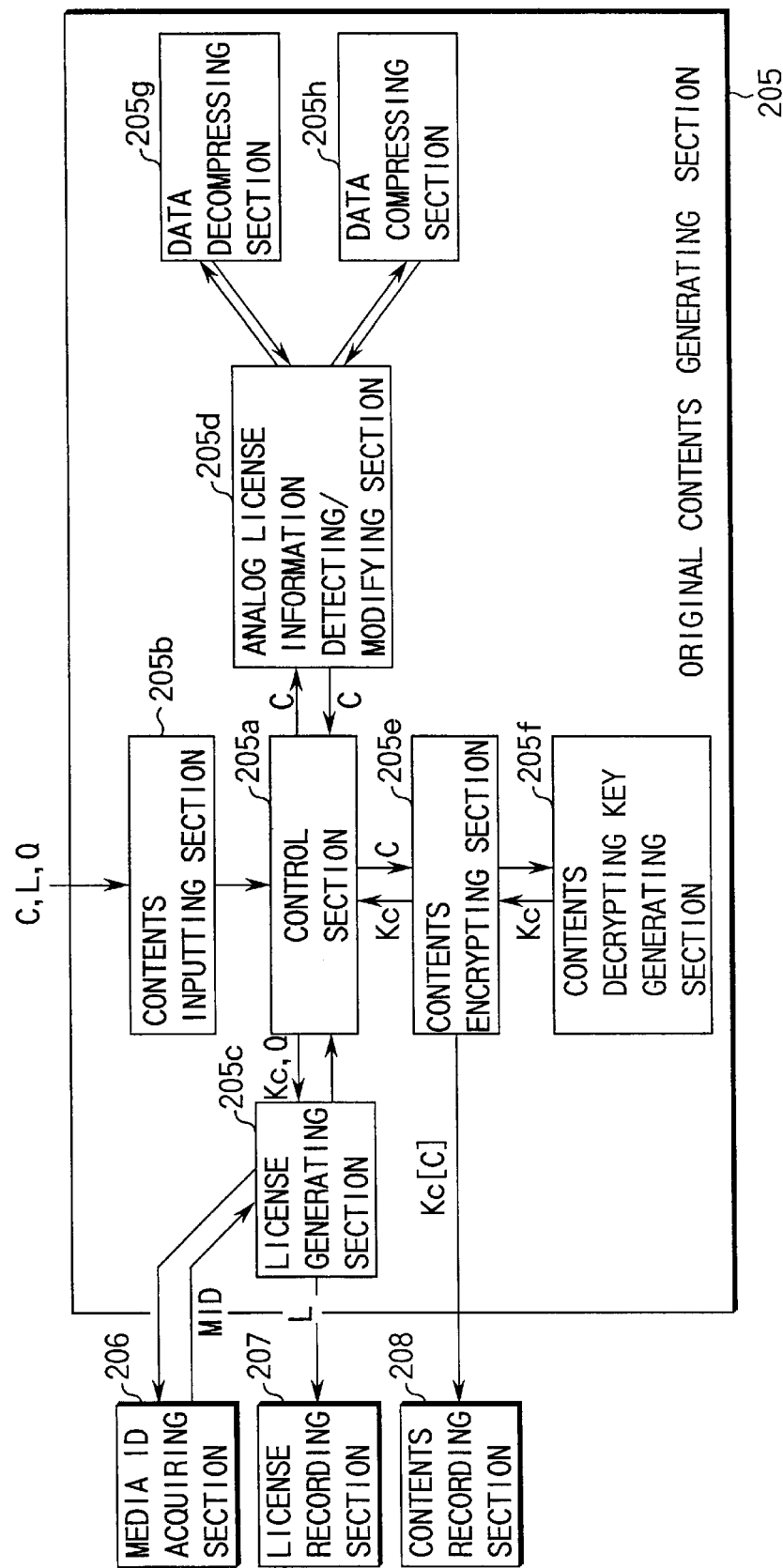
FIG. 23 is a diagram showing a configuration example of the original contents generating section of FIG. 21.

Next, the original contents generating section 205 in the contents recording device of FIG. 21 is described in detail. FIG. 23 shows the configuration of the original contents generating section 205 and FIGS. 27 to 29 shows the flow of the processing.

Figure 27:
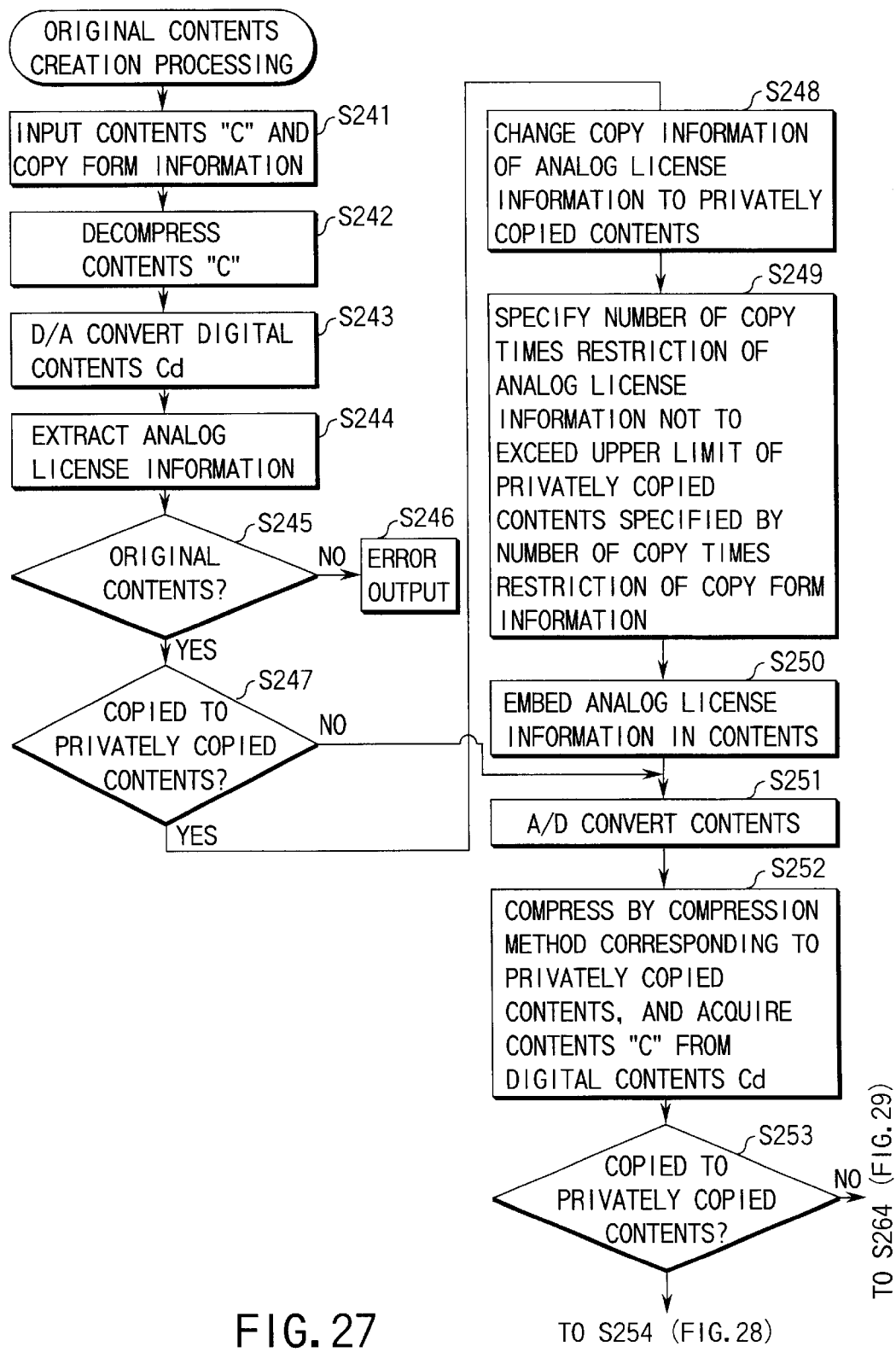
FIG. 27 is a flowchart for explaining the original contents generating processing operation.
Figure 28:
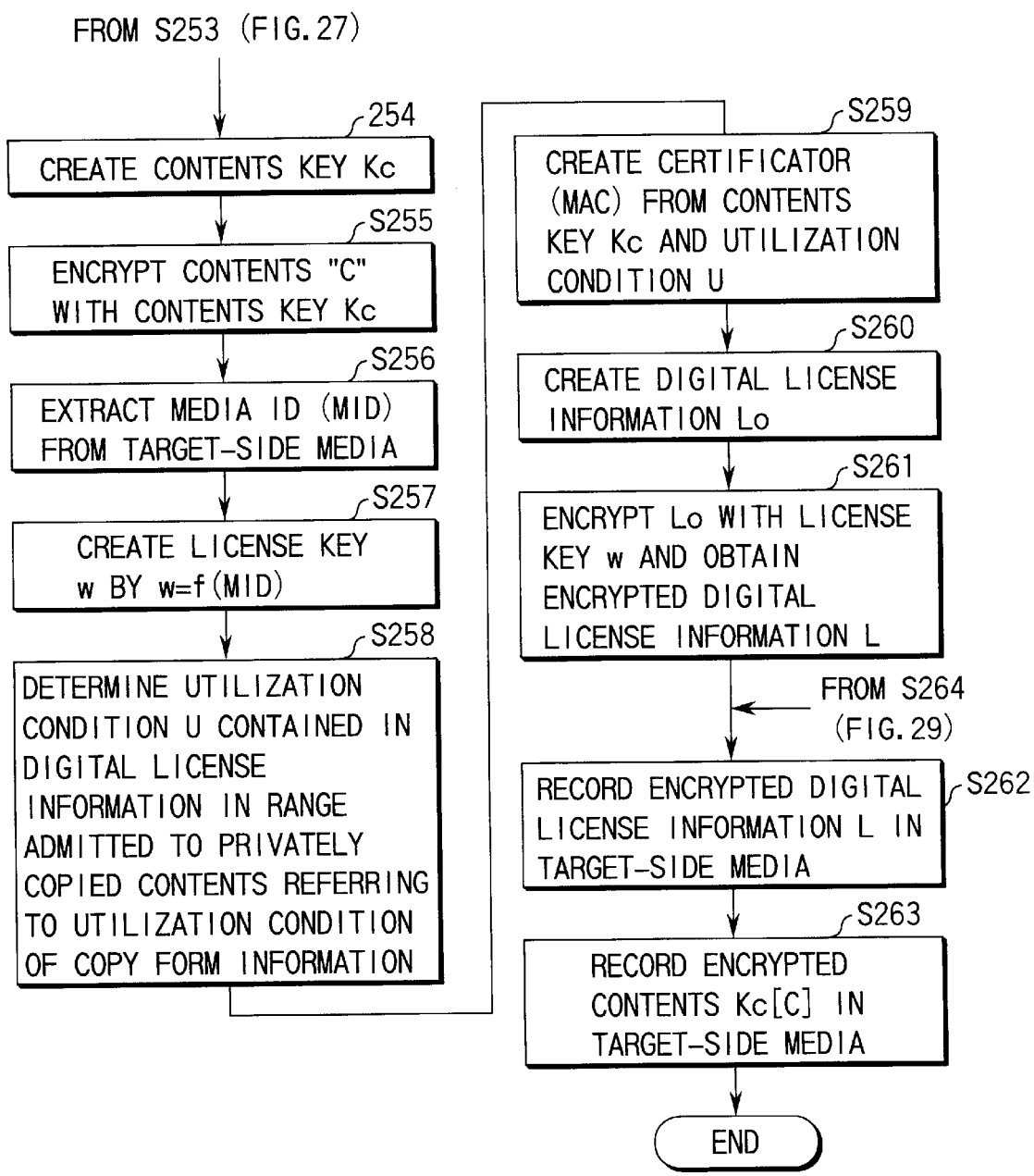
FIG. 28 is a flowchart for explaining the original contents generating processing operation.

Referring now to the flowcharts shown in FIGS. 27 to 29, the original contents generating section 205 of FIG. 23 is described.

When the original contents information is copied, first of all, the contents information C and copy form information Q are input from the contents input section 205b and processing begins (step S241).

The contents information C is sent to the analog license information detecting/modifying section 205d via the control section 205a, and from here, by processing of the data decompressing section 205g, the contents information is depressed (step S242).

The depressed digital contents information Cd is subject to D/A conversion, and the analog license information is detected (steps S243–S234). Here, if it is the original contents information, it is not detected, but if part of the data is tampered and the contents information is input by pretending to be the original contents information, the error is outputted upon detection of the analog license information and the processing is ended (steps S245–S246).

If the source is the original contents information, whether it is copied as the original contents information or as the privately copied contents information is determined by the category of copy information of the copy form information Q (step S247).

Because for the original contents information, the contents with the copyright to users themselves as defined previously, the contents information is able to be copied into the non-encrypted original contents information or privately copied contents information. Naturally, copying the contents as the original contents enables reproduction under more advantageous conditions but if the author him or herself wants to set some kind of restriction to the utilization form in the copied contents information, the object is fulfilled by recording it as privately copied contents information.

If the contents information should be copied as the privately copied contents information, it is necessary to advance to step S248 and record the analog license information in the contents information. Consequently, the analog license information is generated, the copy information is designated as the privately copied contents information, the number of copy restriction is set not to exceed the upper limit value of the number of copies permitted in the number of copy restriction information contained in the utilization form information Q, the analog license information is embedded to contents information C, A/D converted, and then, further compressed by the data compressing section 205h, and a new contents information C is obtained (steps S248 to S252).

On the other hand, when the contents information is copied as the original contents information, it is necessary to advance from step S247 to step S251, A/D convert without generating the analog license information (steps S248 to S250), carry out compression processing, and obtain the contents information C (steps S251 to S252).

The contents information C generated by the abovementioned processing is sent from the analog license information detecting/modifying section 205d to the control section 205a, and the processing procedure is changed whether the contents information is copied to the privately copied contents information or to the original contents information referring to the copy form information Q by the control section 205a (step S253).

First of all, when the contents information is copied to the original contents information, encryption is not required, and the license generating section 205c generates the digital license information and license header only are generated, and the copy information in the license header is designated as "original contents information" (step S264), and the digital license information is recorded in the target-side media via the license recording section 207 (step S262). Now, the digital license information in the case of the original contents information is free of any encrypted part because only the license header exists, and the license key does not need to be generated. Because the contents information C does not need to be encrypted, either, it is recorded on the target side media through the contents recording section 208 as it is (step S263).

Next discussion is made on processing when the contents information is recorded as the privately copied contents information. When the contents information is recorded as the privately copied contents information (step S253), the contents information C is encrypted, and the encrypted digital license information L containing the contents decryption key Kc corresponding to the contents information is generated, and recorded in the media. The procedure is described sequentially.

The control section 205a sends the contents information C to the contents encrypting section 205e, where an instruction is given to the contents decryption key generating section 205f and a contents key Kc is generated (step S254). With the generated contents decryption key Kc, the contents information C is encrypted (step S255), and the encrypted contents information Kc[C] is obtained. The encrypted contents information Kc[C] is delivered to the contents recording section 208 and recorded in the target-side media (step S263).

On the other hand, after the contents decryption key Kc is once delivered to the control section 205a, it is delivered to the license generating section 205c. At the license generating section 205c, media ID (MID) of the target-side media is obtained from the media ID acquiring section 206 (step S256), and by $$w=f(MID)$$

a license key w is generated (step S257).

The contents utilization condition U contained in the digital license information is determined in the range permitted for the privately copied contents information referring to the utilization condition information of the copy form information Q (step S258).

Then, from the contents key Kc and the utilization condition U, a certificator MAC is generated (step S259). With this, the digital license information Lo is generated (step S260), and using the license key w generated previously, the digital license information is encrypted, and the encrypted digital license information L is obtained (step S261).

The obtained encrypted digital license information L is recorded in the target-side media by the license recording section 207 (step S262).

As described above, according to the contents recording device of the second embodiment, when the contents information (may be encrypted or may not be encrypted) and the license information (may be encrypted or may not be encrypted) added to the contents information, which is required for reproducing said contents information is recording in a recording medium, the category of the contents information input is determined, the license information is rewritten based on the determined category and the information dependent on the identifier of the recording medium, the contents information is recorded in the recording medium together with the license information. The license information may be rewritten based on the utilization condition of the contents information. In rewriting the license information, it is not allowed to be rewritten into the license information of the officially copied contents information. Consequently, only the copy information which can be only reproduced under the severer restrictions than the source contents information is allowed to be generated, and the officially copied contents information put on the formal market and the privately copied contents information is differentiated, and the value of the officially copied contents information is increased relatively, thereby contributing to the expansion of the market of the officially copied contents information. In addition, because in the license information, the information dependent on the recording medium is included, whether it is the privately copied contents information or the officially copied contents information, for the copy, the license information must be re-generated, and it is only the just recording device which knows, for example, the function "f" that can re-generate the license information, and the restriction to the number of copies is able to be definitely exercised, and thereby the unjust use can be prevented.

Next description will be made on several modified examples (third to sixth embodiment) of the second embodiment.

Third Embodiment

When contents information other than the original contents information (particularly officially copied contents information) is generated (copied), it is desirable to degrade the contents to a proper level by the privately copied contents generating section 204. This is because the degradation discourages the expectation to copying and promotes the sales of the officially copied contents information put on the formal market. In this sense, noise may be added to the contents information in the analog license information detecting/modifying section 204f or the compression ratio in the data compression may be increased to achieve this scheme. For this purpose, two degrading methods are able to be assumed: a method for adjusting the compression ratio of the data compressing section 204h to cause degradation and a method for increasing the degree of embedding when the analog license information is embedded to cause degradation in the contents information. Particularly in the latter case, there is an advantage that the analog license information is difficult to be peeled.

Fourth Embodiment

It is able to design a recording device (or a recording/reproduction device) that does not admit the original contents information as a kind of contents information. The device of such kind is obtained by eliminating the original contents generating section 205 in the configuration of, for example, FIG. 21 and in the above description, by eliminating the processing concerning the entry of the original contents information and the copy of the original contents information.

Conversely, when the entry of the original contents information is permitted, a method for limiting the input terminals that recognizes the input as the original contents information is assumed. According to this method, taking, for example, a mechanism for allowing the voice input from the microphone terminal to be recorded as the original contents information but the voice input from the radio terminal to be recorded as the privately copied contents information can determine the kind of copy information by the input medium, and even when the copy information is not input in the format of the recording device, the voice not only is able to be recorded but also is able to determines whether the copy is from the original contents information or not.

Fifth Embodiment

The contents reproduction device of the first embodiment and the contents recording device of the second embodiment have independent mechanisms, respectively, but it is also possible to consider a recording/reproduction device of an integrated form. In such event, it is possible to share the media ID acquiring section, data compressing section, data decompressing section, etc., which are component elements with the same functions.

Sixth Embodiment

There allowed to exist is a form in which the source contents information to be input is limited to the analog contents information only, and copy to the privately copied contents information only is allowed. By doing so, when the digital contents information is recorded, the contents quality degradation is able to result from allowing the contents information to pass the analog layer once, and degradation equivalent to that of conventional privately copied contents information is achieved, and the privately copied contents information from the viewpoint of the contents quality is achieved.

Figure 32:
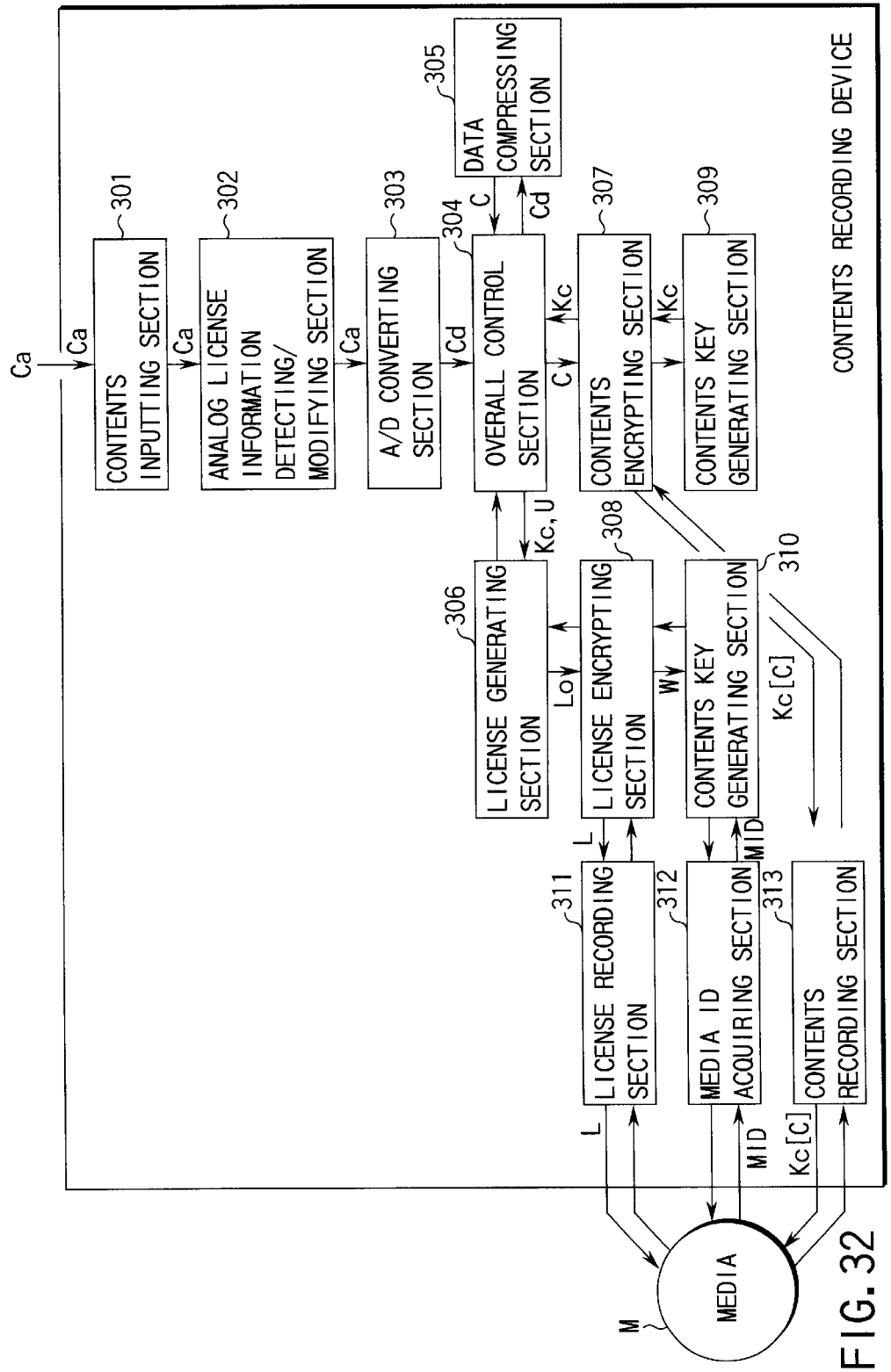
FIG. 32 shows a configuration example of the contents recording device of the sixth embodiment according to the present invention, where the source contents are restricted to analog contends only.
Figure 33:
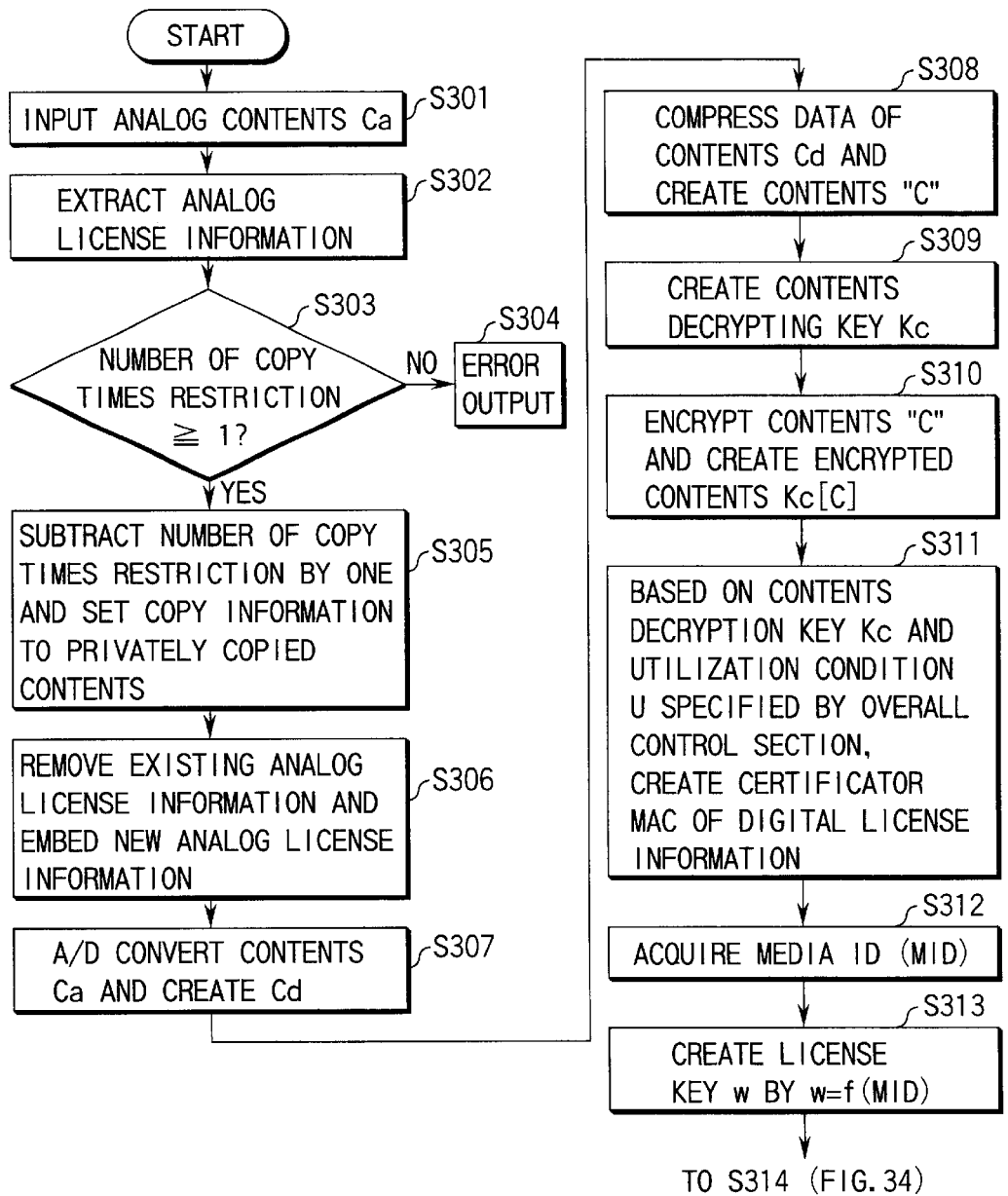
FIG. 33 is a flowchart for explaining the processing operation of the contents recording device of FIG. 32.
Figure 34:
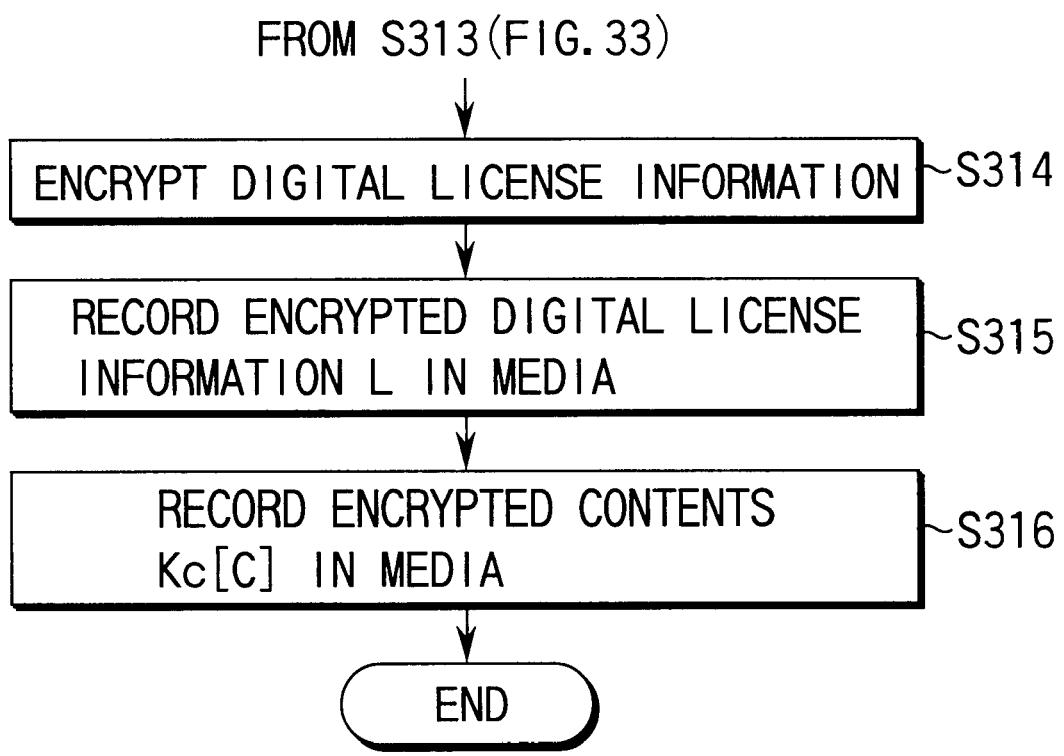
FIG. 34 is a flowchart for explaining the processing operation of the contents recording device of FIG. 32.

The configuration of such contents recording device is shown in FIG. 32 and the flow of the processing in FIGS. 33 to 34.

Referring now to the flowchart shown in FIGS. 33 to 34, the contents recording device of FIG. 32 is described.

The analog contents information Ca is input from the contents inputting section 301 (step S301). The input analog contents information Ca is sent to the analog license information detecting/modifying section 302, where the analog license information is extracted (step S302) and the restriction of number of copies contained in the analog license information is confirmed to be "1" or more (step S303). If it is not "1" or more, further copy is unable to be generated, and the error is outputted (step S304).

The cases in which the analog license does not exist or the restriction of number of copies is "1" or more are discussed. If the analog license information does not exist, the restriction of number of copies is set to the upper limit of the privately copied contents information, and if the analog license information exists, the restriction of number of copies is subtracted by one and in either case, the analog license information with the copy information set to the privately copied contents information is generated, and if the analog license information has already existed, after it is removed, the analog license information newly generated is embedded in the contents information (steps S305–S306).

The contents information Ca with the analog license information embedded is sent to the A/D converting section 303 via the overall control section 304, where using the contents decrypting key Kc generated by the contents key generating section 309, the contents information C is encrypted and the encrypted contents information Kc[C] is generated (steps S309–S310).

The contents encrypting section 307 sends the contents decryption key Kc to the overall control section 304, while it is also sent to the license generating section 306 together with the utilization condition U determined by the whole control section 304.

At the license generating section 306, the certificator MAC is generated from the contents decryption key Kc and the utilization condition U, and the digital license information Lo is generated. The generated digital license information Lo is sent to the license encrypting section 308, where using the license key w generated by the license key generating section 310, the digital license information Lo is encrypted (steps S11–S314).

Now, the flow of processing by the license key generating section 310 is described. At the license key generating section 310, the media ID (MID) for recording the encrypted contents information is acquired via the media ID acquiring section 312 (step S312) and by the equation $$w=f(MID),$$

the license key w is generated (step S313).

Now, the encrypted digital license L is recorded to the medium via the license recording section 311 (step S315). Similarly, the encrypted contents information Kc[C] is also recorded (step S316).

By integrating the reproduction device that does not admit the original contents information with the recording device of the present embodiment or using them in a pair, a contents recording/reproduction device with higher security is able to be realized. That is, when the contents information other than the recording/reproduction device of the present invention is input and recorded, the analog input only is admitted, and the digital contents information record is restricted to the privately copied contents information. This means that even in the digitally recording and reproducing world, since the contents information once passes through the analog contents information, improvement in the quality is unable to be expected from the quality of the conventional recording/reproduction system, and this not only serves as a deterrent of copying but also relatively increases the value of officially copied contents information and the sales market of the officially copied contents information is able to be secured more definitely.

Seventh Embodiment

In the present embodiment, the contents selling device and the contents purchasing device used for purchasing and reproducing the digital contents information from other party are described. Here one embodiment of a mechanism for purchasing and selling the digital contents information, for example, via the Internet server or an automatic vending machine is described.

First of all, the embodiment of the contents selling device is explained. The contents selling device means a selling device for generating and selling the officially copied contents information in response to the purchase request. In the present embodiment, for a contents selling server device, the shopping mall on the Internet materialized on the network is assumed.

Figure 35:
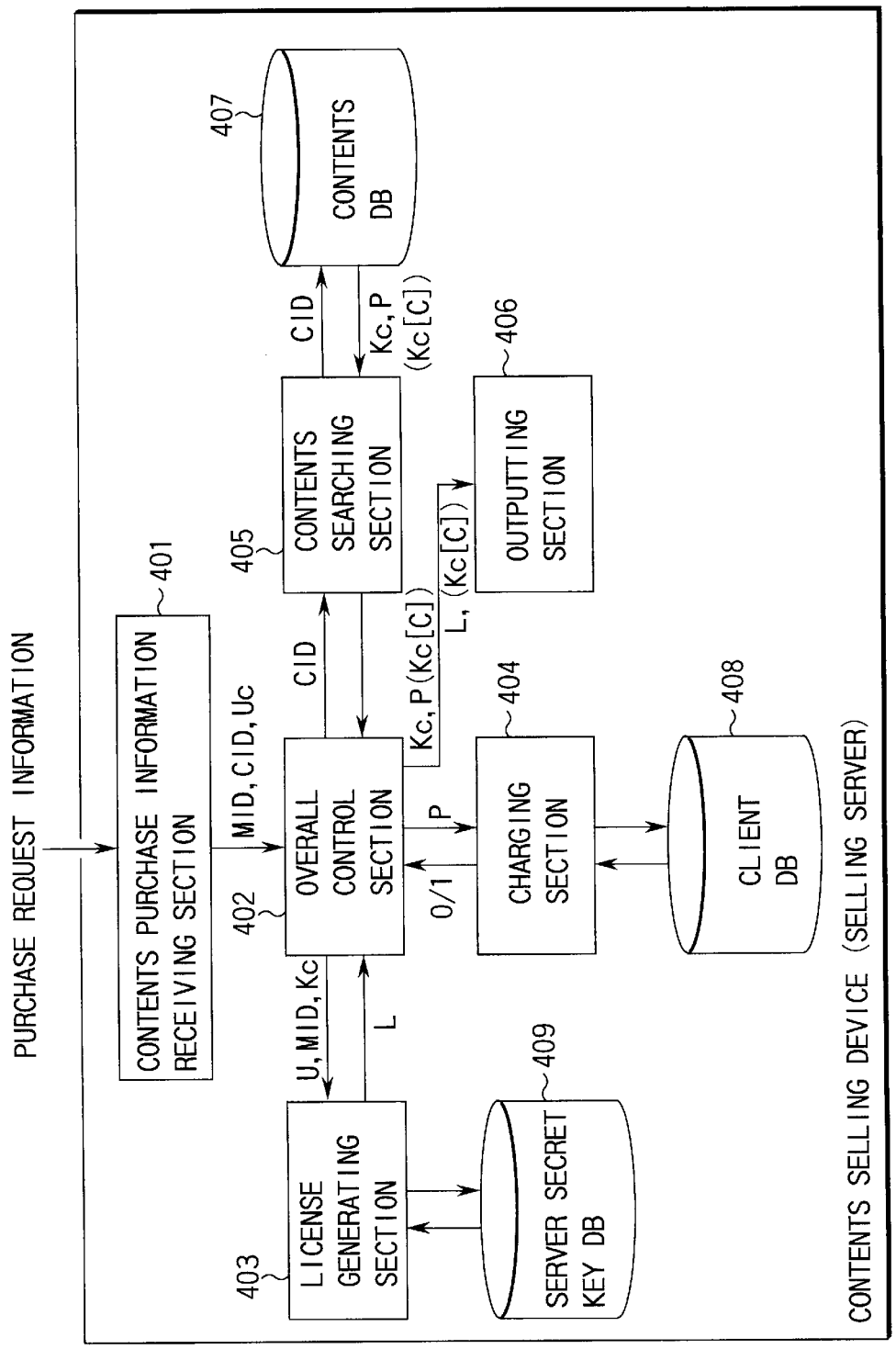
FIG. 35 is a diagram showing a configuration example of the contents selling device of the seventh embodiment according to the present invention.
Figure 36:
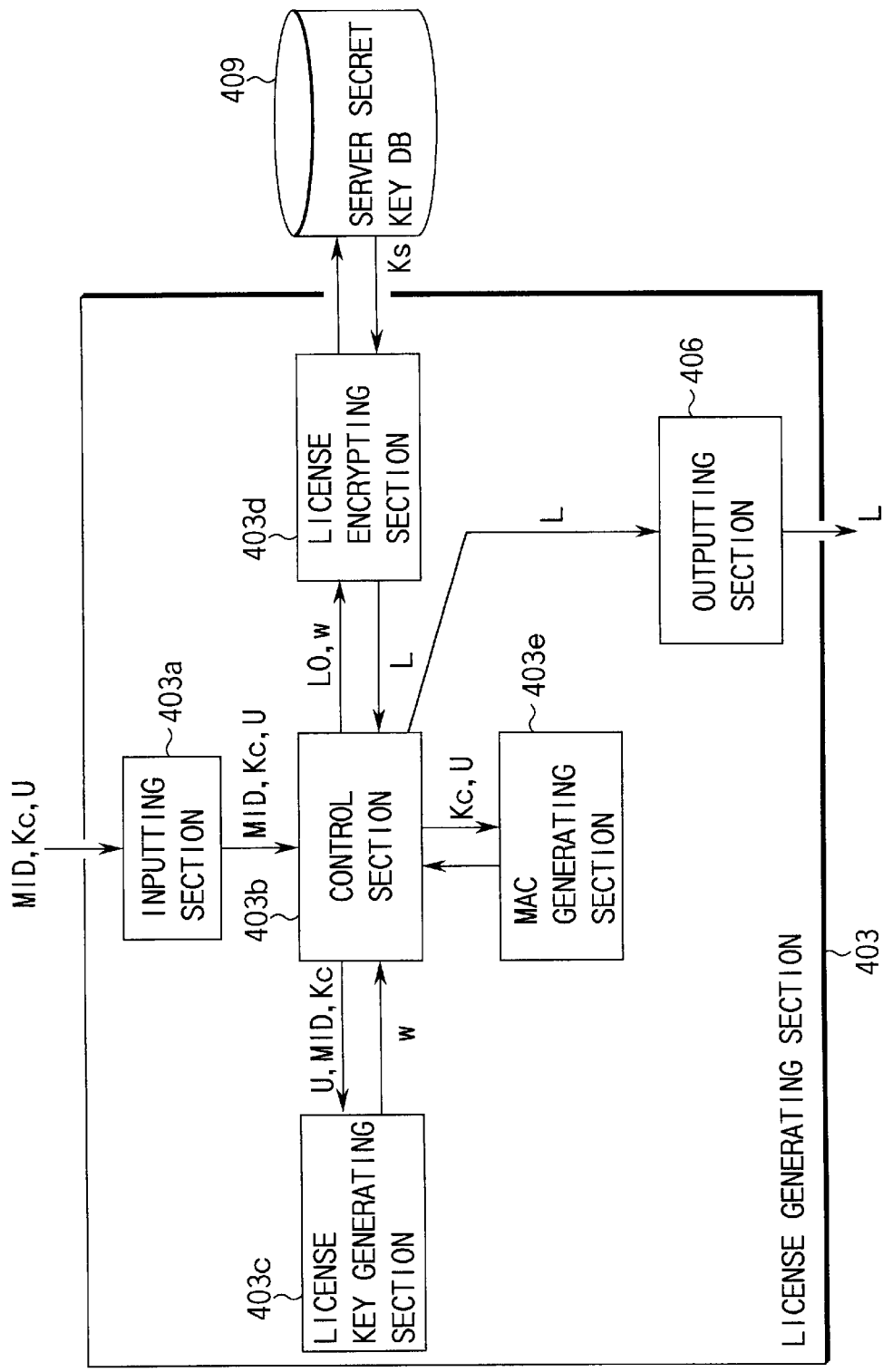
FIG. 36 is a diagram showing a configuration example of the license generating section of the contents selling device of FIG. 35.

FIG. 35 is an overall configuration diagram of the selling server, and FIG. 36 is the configuration diagram of the license generating section 403 of FIG. 35.

Figure 37:
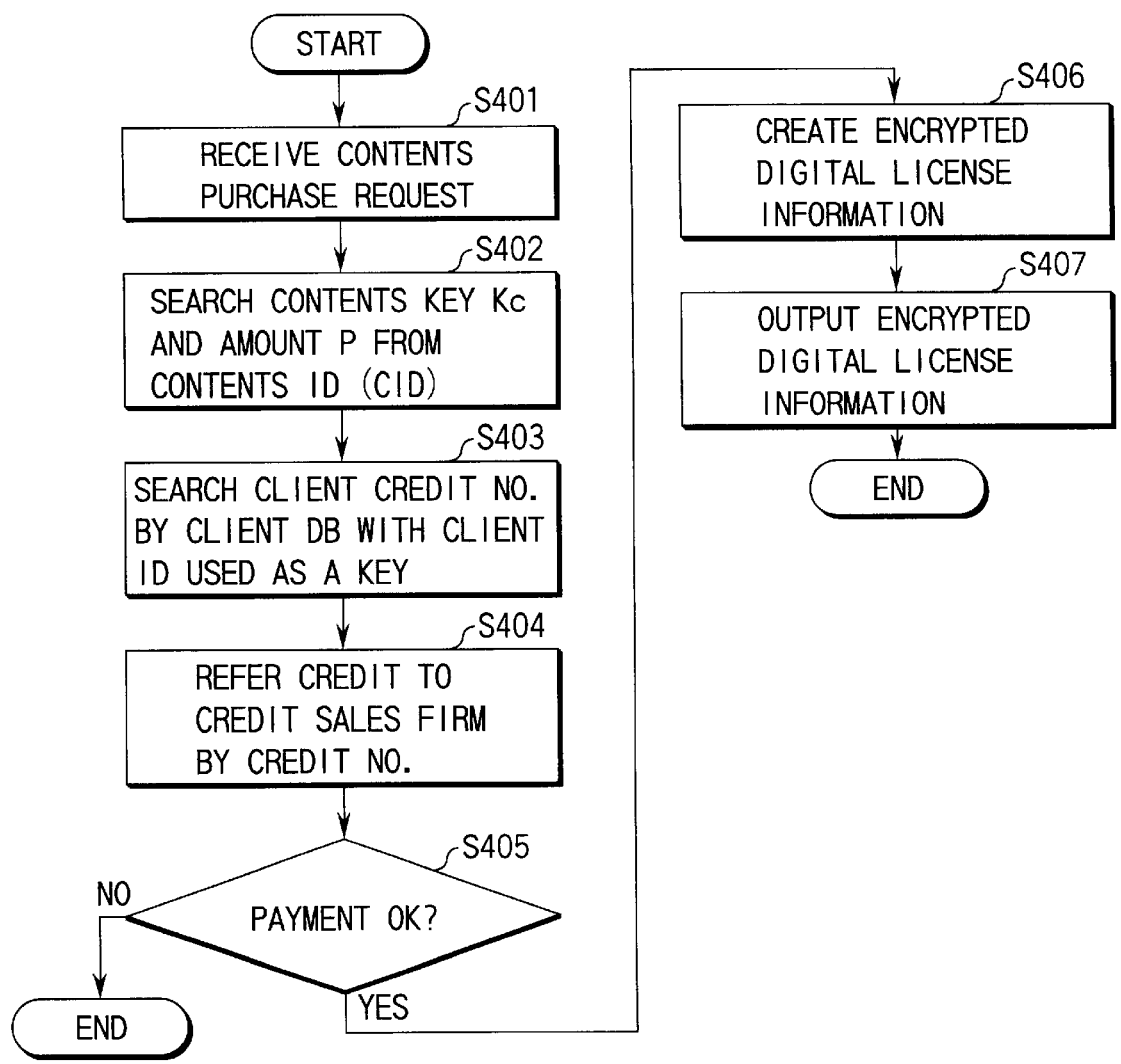
FIG. 37 is a flowchart for explaining the processing operation of the contents selling device of FIG. 35.
Figure 38:
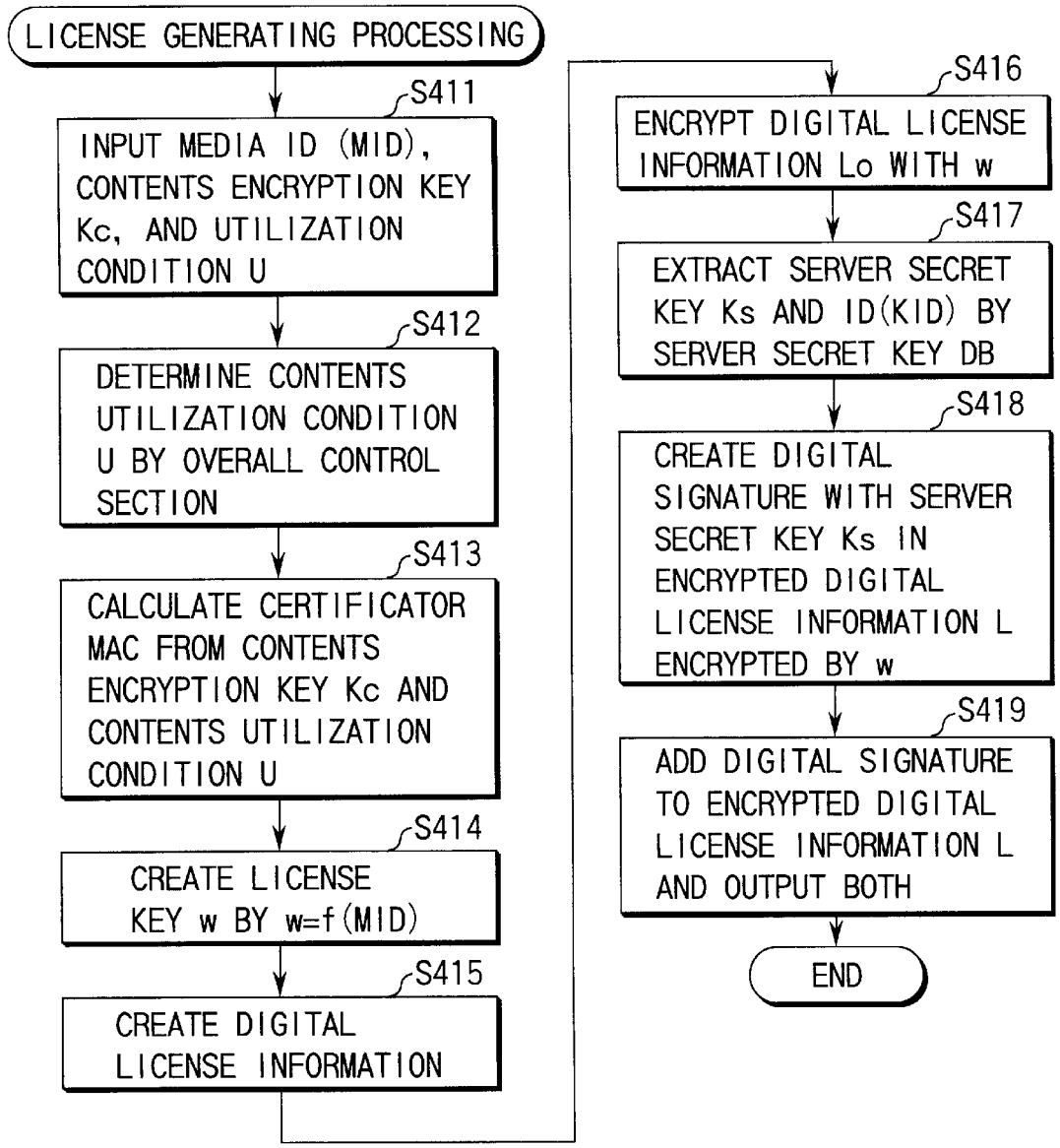
FIG. 38 is a flowchart for explaining the license generating processing operation.

First of all, referring to FIGS. 37 and 38 showing the flow of the whole processing of the selling server, the selling server is described. The selling server begins operation by receiving the contents purchase request from the client (step S401). As shown in FIG. 39, the purchase request information comprises the ID information of the client who made a purchase request, contents ID (CID) of the contents information desired to purchase, purchase utilization condition (Uc), media ID (MID) of the recording media for the client to record the contents information, and the client address.

When the purchase request information is received, the selling server sends this to the overall control section 402, and sends the contents ID contained in the purchase request information to the contents searching section 405, searches the contents database (DB) 407, and extracts the contents decryption key Kc and the selling amount P (and depending on the circumstances, encrypted contents information Kc[C] (step S402).

Now, for the condition to take out the encrypted contents information Kc[C], for example, the contents ID is expressed with a sufficiently large bit number, and if there exists any redundant bit, one bit of the redundant bits may be used as a flag for determining whether the encrypted contents information should be transmitted or not.

Next (or simultaneously with the processing in contents searching section 405), the overall control section 402 searches the credit number of the client from the client database (DB) 408 using the client ID as a key, and the credit is referred with the searched credit number (steps S403 and S404). If the credit reference result evidences that the payment is able to be made, the encrypted digital license information is generated based on the procedure described in detail as follows, and the encrypted digital license information is outputted to the client address (steps S405 though 407). If as a result of the credit reference, it is evidenced that the payment is unable to be made, the effect is notified to the client address. The notice and the output may be made by electronic mail or when the network is directly connected, the network connected may be used.

Referring now to the flowchart shown in FIG. 38, the processing for generating the encrypted digital license information by the license generating section 403 of FIG. 36 is described.

The license generating section 403 receives the entry of the media ID (MID) extracted from the contents decryption key Kc and the purchase request information outputted by the contents DB 407 and begins processing (step S411).

First of all, the license generating section 403 determines the utilization condition U, generates the certificator MAC from the contents decryption key Kc and the utilization condition U, and generates the digital license information Lo (steps S412 and S413).

Then, by the media ID (MID) input, the license generating section generates a license key w at step S414 by $$w = f(MID)$$

The license key generating section 403c sends the license key w and the digital license information Lo to the control section 403b, and by the control section 403b, the license information Lo is encrypted to generate the encrypted digital license information (steps S415 and S416).

Further, from the server secret key database (DB) 409, the key server secret key Ks and the secret key ID (KID) are extracted (step S417), the digital signature is affixed to the encrypted digital license information L with the secret key Ks (step S418), and adding this information, the encrypted license L is generated. The generated digital license information L is outputted to complete the processing (step S419).

This concludes the description of the contents selling device, that is, the selling server. Next description is made on the mechanism of the contents purchasing device corresponding to the selling. The contents purchasing device may be the reproduction device itself, but it is not always the reproduction device itself, but may be any device such as personal computers, etc. or special-purpose device, to which network is connected.

Figure 40:
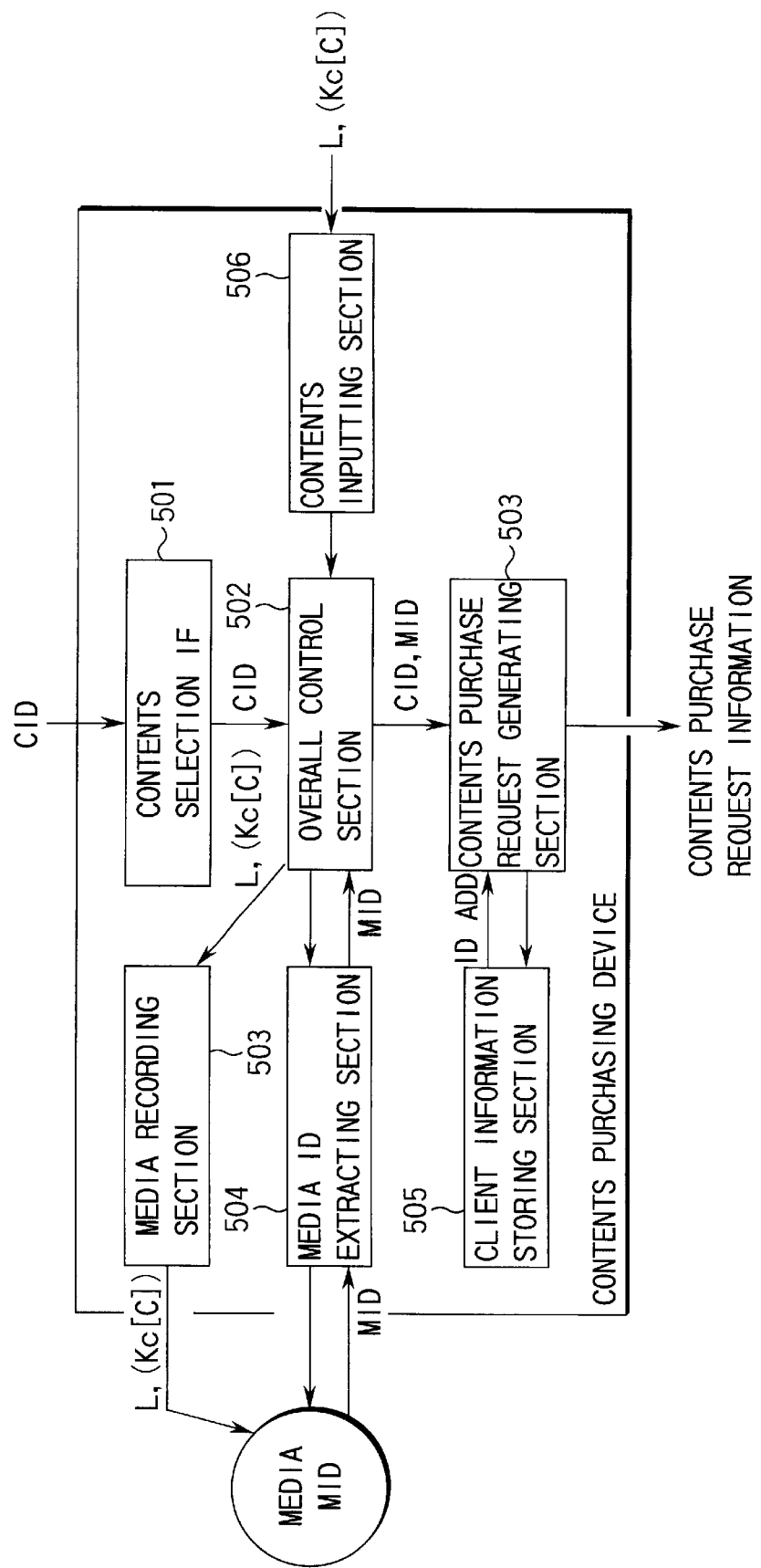
FIG. 40 is a diagram showing a configuration example of the contents purchasing device.
Figure 41:
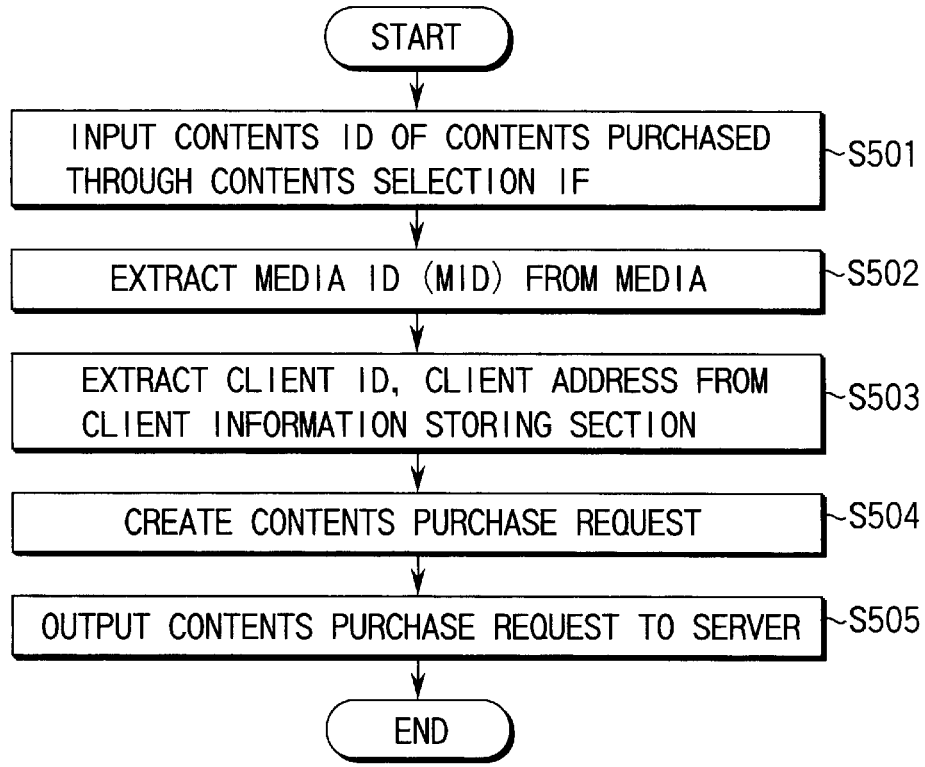
FIG. 41 is a flowchart for explaining the processing operation of the contents purchasing device.
Figure 42:
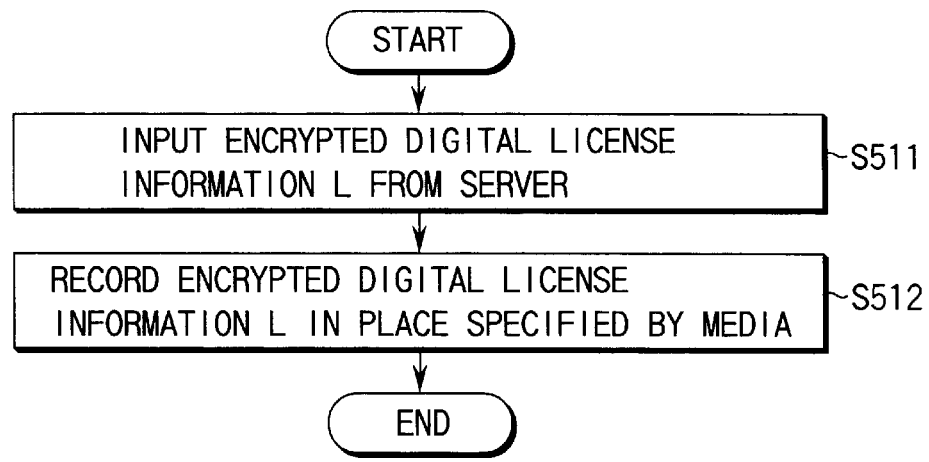
FIG. 42 is a flowchart for explaining the processing operation of the contents purchasing device of FIG. 40.

FIG. 40 shows the configuration of the contents purchasing device, and referring now to the flowchart shown in FIGS. 41 to 42, the contents purchasing device is described.

To the contents purchasing device, the contents ID of the contents information to be purchased is input through the contents selection interface (IF) 501, and sent to the overall control section 502 (step S501). The contents selection IF 501 may be of the type to input the contents ID from the keyboard, or the user may input the contents ID by searching and specifying the contents information with the name of singer or composer used as a key by the special-purpose search software or input software.

The overall control section 502 receives the contents ID entry and extracts the media ID (MID) from the media which records the contents information via the media ID extracting section 504 (or which has already recorded the contents information) (step S502).

Then (or simultaneously), from the client information storing section 505, the client ID (of the purchaser), the client address are extracted (step S503), and based on these pieces of information extracted, the purchase request information as shown in FIG. 39 is transmitted to the selling server (steps S504–S505).

In the present embodiment, the client information is stored in the client information storing section 505, but this section may be changed to the entry from the outside to carry out the same processing.

In addition, if the contents ID is transmitted from the contents selling device to the encrypted license L (if there is no encrypted contents information on the contents purchasing device side, together with the encrypted contents information Kc[C] based on the purchase request information, the contents selling device records these in the media from which the media ID is extracted (steps S511–S512).

This concludes the description on the configuration of the contents purchasing device and the flow of processing. From the above-mentioned configuration, it is clear that the contents purchasing device is able to be integrated with the contents reproduction device. That is, the configuration of the reproduction device shown in FIG. 8 is functionally independent fro the configuration of the selling client shown in FIG. 40, and a device which incorporates both functions is able to be configured. Similarly, the same relation holds for with the contents recording/reproduction device described in the second embodiment.

Consequently, it is able to assume a system for integrating the contents selling device with the contents purchasing device. This is a device like an automatic vending machine of the contents information, and is able to be realized by using the fee collecting section 404 in the configuration of the contents selling device of FIG. 35 for the coin/bill detection/storing device in the automatic vending machine and recording the generated encrypted license L (and encrypted contents information) to the media via the media recording section 503 in the configuration of the contents information purchasing device of FIG. 40.

By achieving this kind of automatic vending machine, the client is able to bring the media to the automatic vending machine and purchase the contents information and the license. Needless to say, it is possible to configure an automatic vending machine with the contents purchasing device only. In such event, the device must be connected to the contents selling device via telephone line, etc.

As described above, according to the present invention, the contents information copied by the properly authorized party (officially copied contents information) is able to be distributed in the more advantageous form than the contents information copied without proper authorization (privately copied contents information). As a result, the demand of officially copied contents information is increased, and the information distribution mechanism suited for interests of the contents provider, contents user, and electronic equipment provider can be provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information reproduction device comprising:
    a contents inputting unit configured to receive contents information and license information, the license information including first information indicating whether the contents information is officially copied contents information which is copied under a right for selling the contents information or privately copied contents information which is copied without a right for selling the contents information;
    a determining unit configured to determine whether the contents information is the officially copied contents information or the privately copied contents information based on the first information of the license information; and
    a reproducing unit configured to reproduce the contents information based on a determination by the determining unit, the reproducing unit reproducing the officially copied contents information by using one of a first digital reproduction device, a second digital reproduction device of which quality is lower than a quality of the first digital reproduction device, and an analog reproduction device and reproduces the privately copied contents information by using one of the second digital reproduction device and the analog reproduction device.

2. The information reproducing device according to claim 1, wherein
    said first information includes verification information for verifying the officially copied contents information; and
    said determining unit determines whether the contents information is the officially copied contents information or the privately copied contents information based on the verification information.

3. The information reproduction device according to claim 1, wherein
    said license information includes utilization condition information including effective date information and effective number of times information, the utilization condition information of the privately copied contents information being more restricted than the utilization condition information of the officially copied contents information; and
    said reproducing unit reproduces the contents information based on the utilization condition information.

4. The information reproduction device according to claim 1, wherein
    said license information is encrypted by key information generated based on information dependent on a recording medium in which the contents information is recorded.

5. The information reproduction device according to claim 1, wherein
    said license information includes second information indicating whether or not the contents information is original contents information which is compressed but is not encrypted,
    said determining unit determines whether the contents information is the original contents information or not based on the second information of the license information; and
    said reproducing unit reproduces the original contents information in a same manner as the officially copied contents information.

* * * * *